(12) United States Patent
Li et al.

(10) Patent No.: US 11,988,812 B2
(45) Date of Patent: May 21, 2024

(54) OPTICAL IMAGING LENS GROUP

(71) Applicant: ZHEJIANG SUNNY OPTICAL CO., LTD, Ningbo (CN)

(72) Inventors: Long Li, Ningbo (CN); Saifeng Lyu, Ningbo (CN)

(73) Assignee: ZHEJIANG SUNNY OPTICAL CO., LTD, Ningbo (CN)

(*) Notice: Subject to any disclaimer, the term of this patent is extended or adjusted under 35 U.S.C. 154(b) by 861 days.

(21) Appl. No.: 17/060,632

(22) Filed: Oct. 1, 2020

(65) Prior Publication Data

US 2021/0018728 A1 Jan. 21, 2021

Related U.S. Application Data

(63) Continuation of application No. PCT/CN2019/084947, filed on Apr. 29, 2019.

(30) Foreign Application Priority Data

Aug. 2, 2018 (CN) .......................... 201810871383.8

(51) Int. Cl.
*G02B 13/00* (2006.01)
*G02B 9/64* (2006.01)
*G02B 27/00* (2006.01)

(52) U.S. Cl.
CPC ........... *G02B 13/0045* (2013.01); *G02B 9/64* (2013.01); *G02B 27/0025* (2013.01)

(58) Field of Classification Search
CPC .. G02B 13/0045; G02B 9/64; G02B 27/0025; G02B 13/18; G02B 13/002; G02B 3/04;
(Continued)

(56) References Cited

U.S. PATENT DOCUMENTS 9,523,841 B1\* 12/2016 Chen .................. G02B 27/0025
2017/0045714 A1 2/2017 Huang
(Continued)

FOREIGN PATENT DOCUMENTS

CN 106443987 A 2/2017
CN 106896473 A 6/2017
(Continued)

OTHER PUBLICATIONS

International Search Report in Corresponding International Application No. PCT/CN2019/084947, dated Aug. 8, 2019; 9 pgs.
(Continued)

*Primary Examiner* — Thomas K Pham
*Assistant Examiner* — Kuei-Jen L Edenfield
(74) *Attorney, Agent, or Firm* — HAUPTMAN HAM, LLP

(57) ABSTRACT

The present disclosure discloses an optical imaging lens group including, sequentially from an object side to an image side along an optical axis, a first lens, a second lens, a third lens, a fourth lens, a fifth lens, a sixth lens, a seventh lens and an eighth lens, each of which has refractive power. Each of the first lens and the fourth lens has positive refractive power. The eighth lens has negative refractive power. An object-side surface of the third lens is a convex surface, and an image-side surface thereof is a concave surface. An object-side surface of the fourth lens is a concave surface, and an image-side surface thereof is a convex surface. A total effective focal length f of the optical imaging lens group, an effective focal length f2 of the second lens, and an effective focal length f3 of the third lens satisfy |f/f2|+|f/f3|<1.

18 Claims, 10 Drawing Sheets

(58) Field of Classification Search
CPC .......... G02B 9/08; G02B 13/00; G02B 27/00; G02B 3/02; G02B 5/005; G02B 5/208; G02B 13/06
USPC ................................ 359/750, 739, 681, 754
See application file for complete search history.

(56) References Cited

U.S. PATENT DOCUMENTS

| | | | |
|---|---|---|---|
| 2018/0011226 A1 | 1/2018 | Huang et al. | |
| 2019/0056568 A1* | 2/2019 | Huang | G02B 9/64 |
| 2019/0204558 A1* | 7/2019 | Jhang | G02B 9/64 |
| 2019/0310445 A1* | 10/2019 | Hashimoto | G02B 13/0045 |

FOREIGN PATENT DOCUMENTS

| | | |
|---|---|---|
| CN | 107678140 A | 2/2018 |
| CN | 107703608 A | 2/2018 |
| CN | 107703609 A | 2/2018 |
| CN | 207301466 U | 5/2018 |
| CN | 207424360 U | 5/2018 |
| CN | 207424361 U | 5/2018 |
| CN | 108107545 A | 6/2018 |
| CN | 108121053 A | 6/2018 |
| CN | 207557562 U | 6/2018 |
| CN | 108254856 A | 7/2018 |
| CN | 108681040 A | 10/2018 |

OTHER PUBLICATIONS

Office Action issued in corresponding Indian Application No. 202017043532; dated Dec. 13, 2021; 5 pgs.
International Search Report issued in corresponding International Application No. PCT/CN2019/084947, dated Aug. 8, 2019, pp. 1-2, China National Intellectual Property Administration, Beijing, China.

* cited by examiner

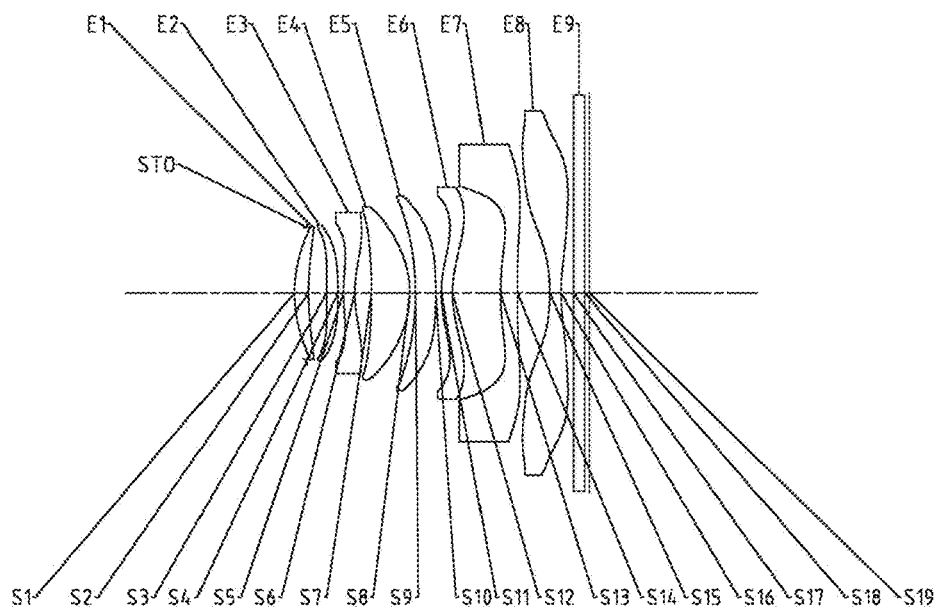
Fig. 5
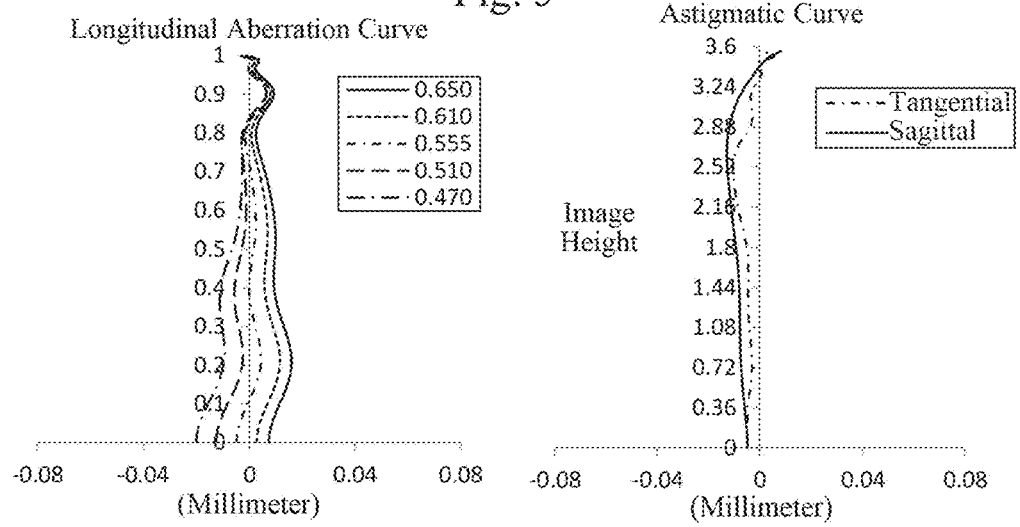
Fig. 6A
Fig. 6B
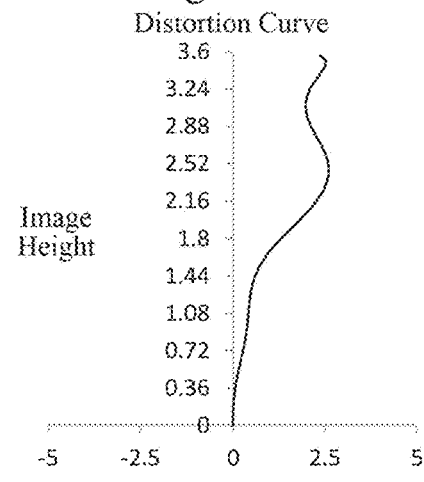
Fig. 6C
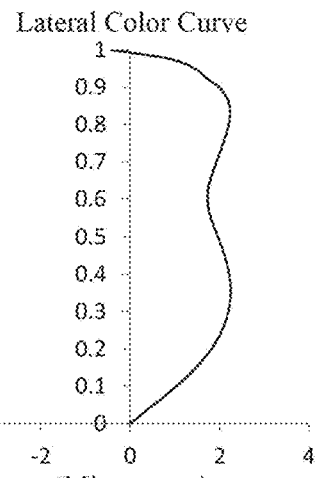
Fig. 6D

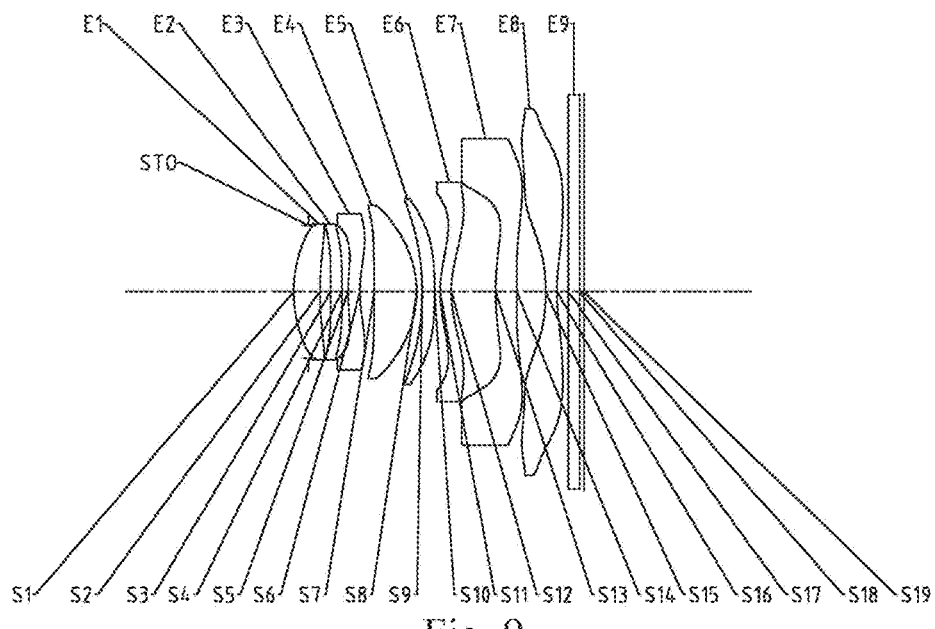
Fig. 9
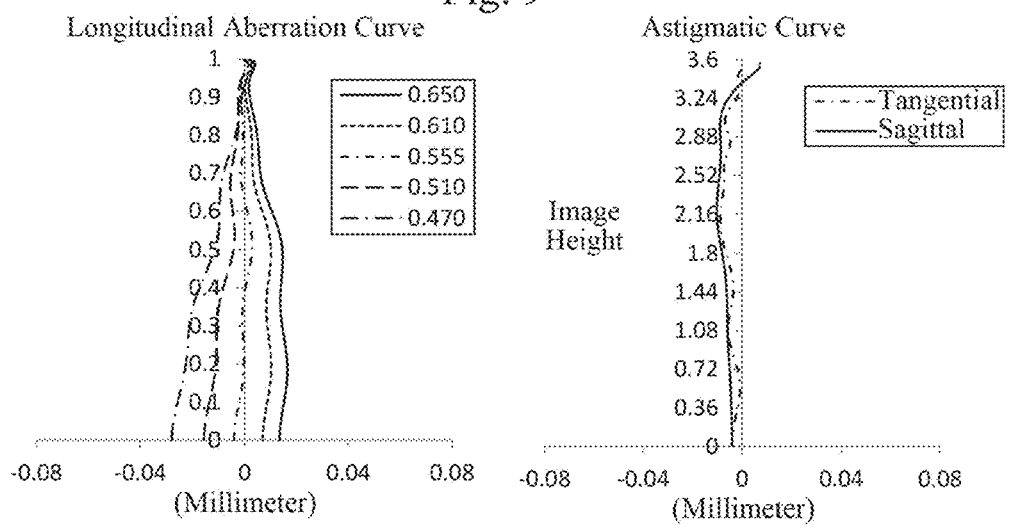
Fig. 10A
Fig. 10B
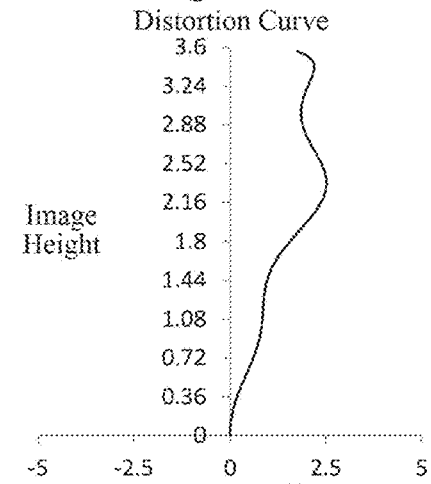
Fig. 10C
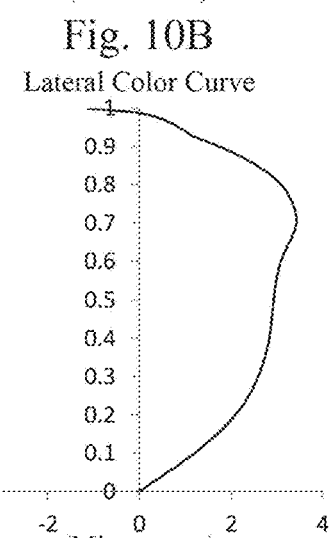
Fig. 10D

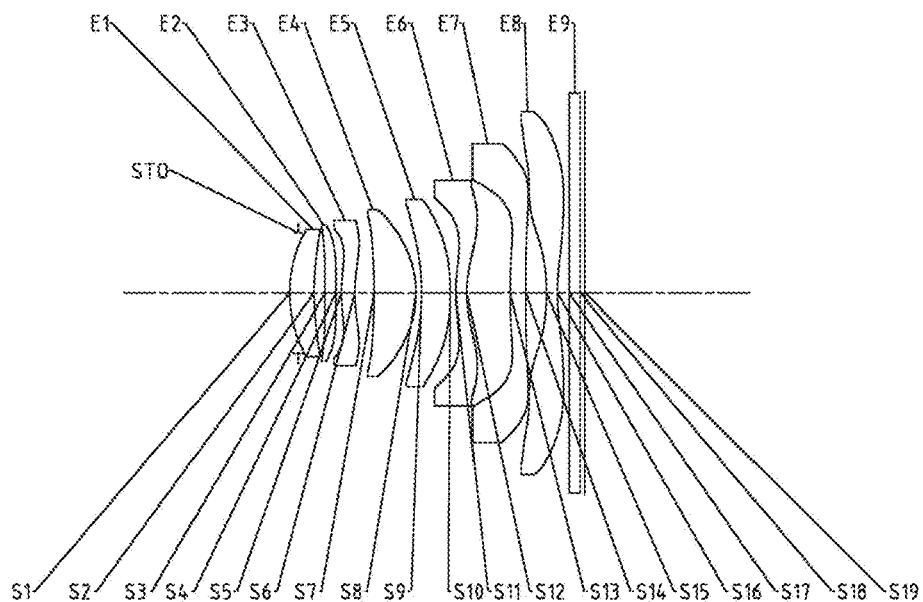
Fig. 13
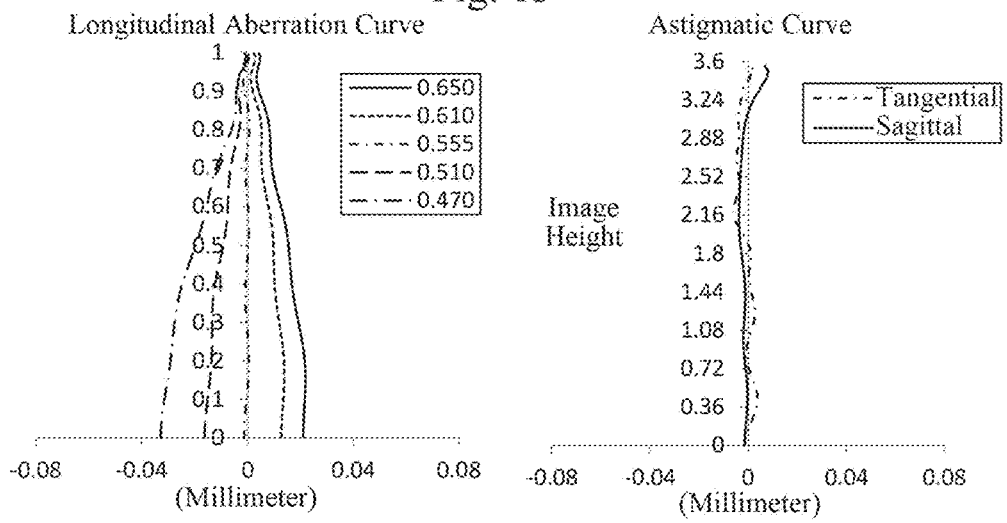
Fig. 14A
Fig. 14B
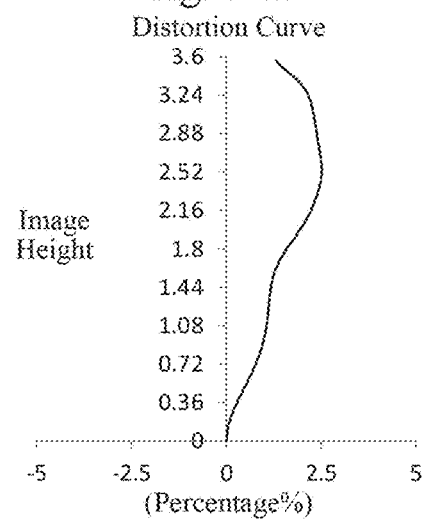
Fig. 14C
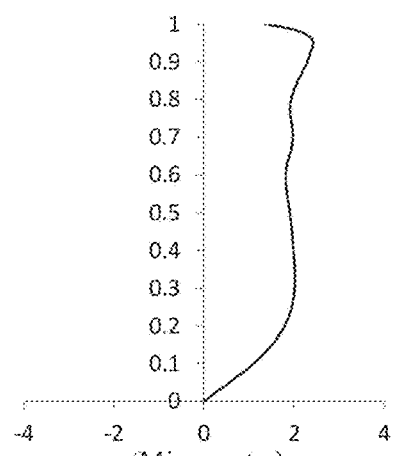
Fig. 14D

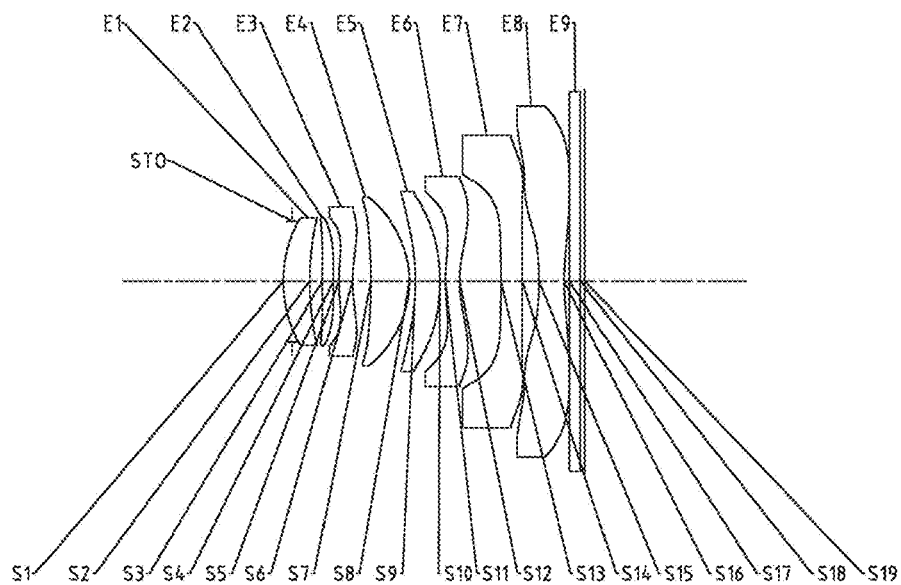
Fig. 17
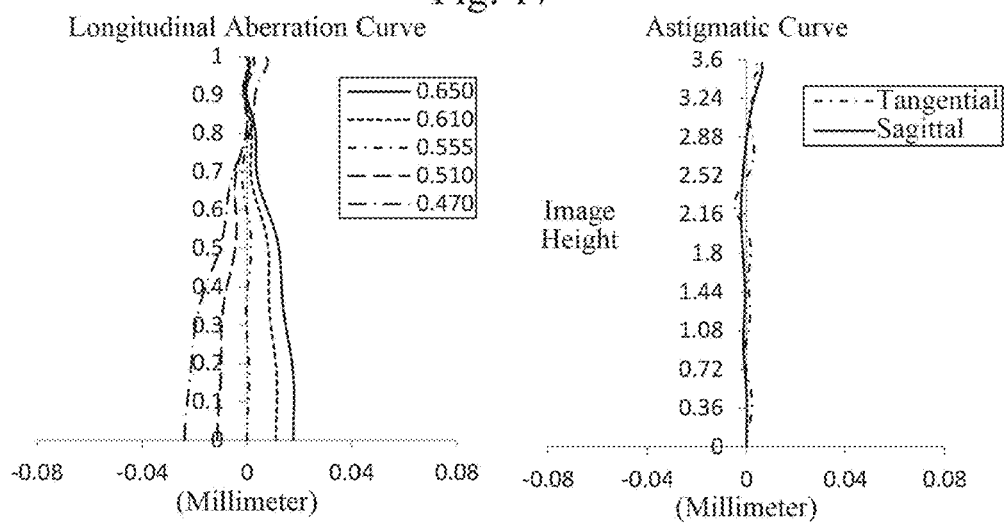
Fig. 18A
Fig. 18B
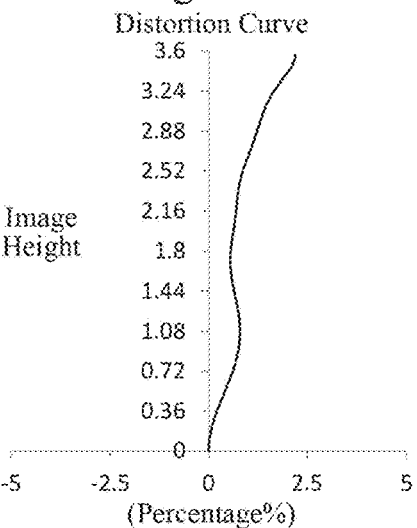
Fig. 18C
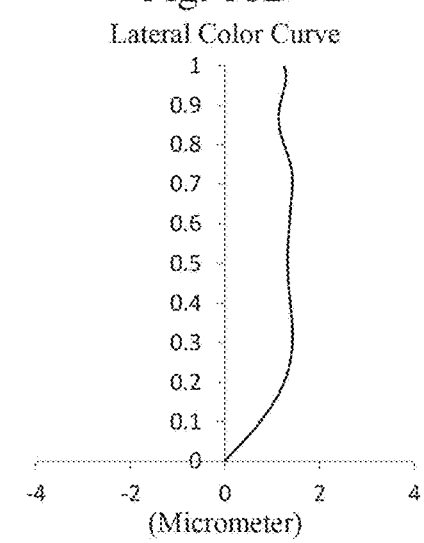
Fig. 18D

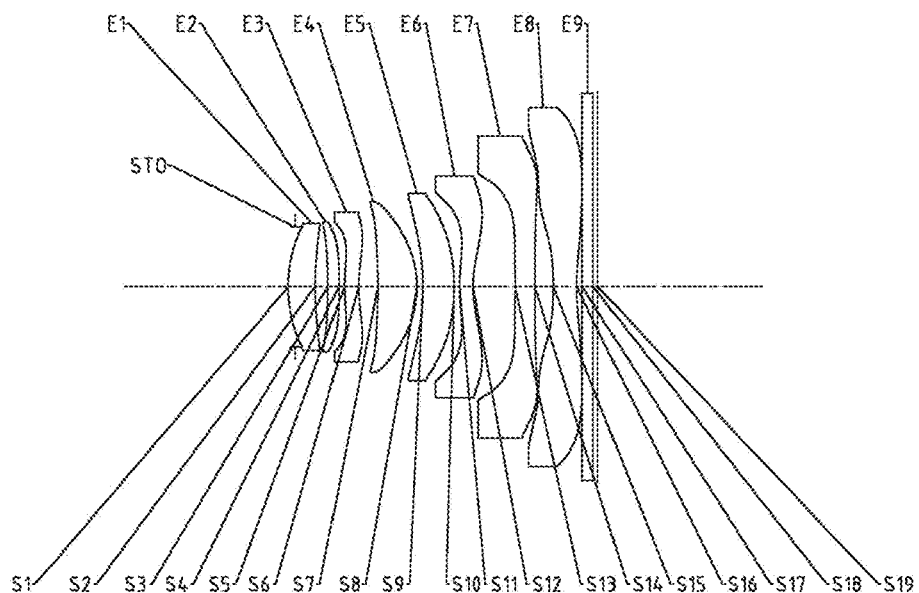
Fig. 19
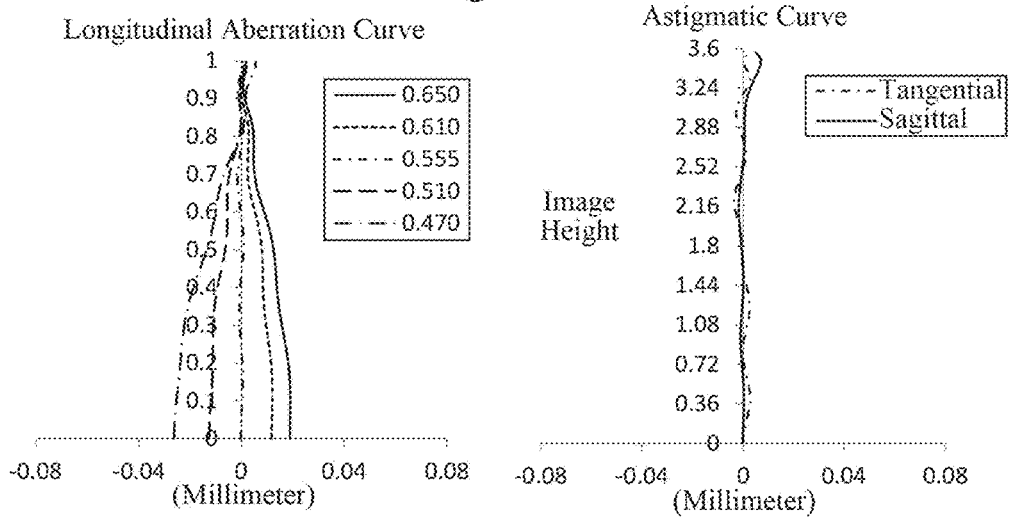
Fig. 20A
Fig. 20B
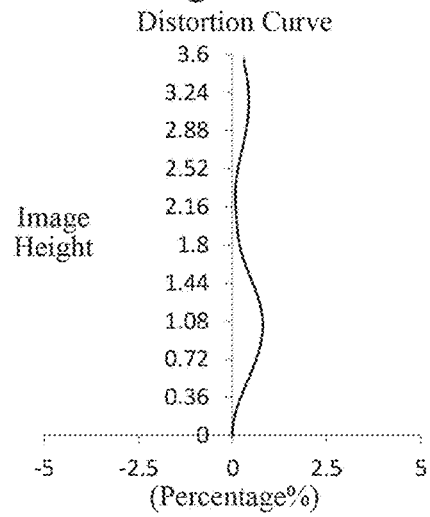
Fig. 20C
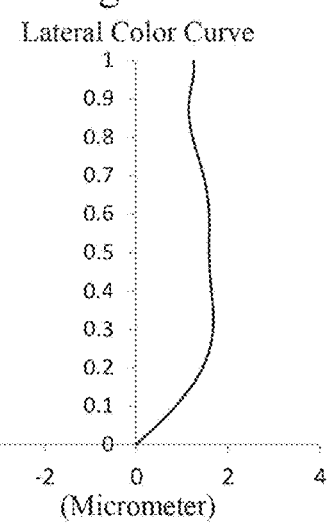
Fig. 20D

OPTICAL IMAGING LENS GROUP

CROSS-REFERENCE TO RELATED APPLICATIONS

The present patent application is a continuation of International Application No. PCT/CN2019/084947, filed on Apr. 29, 2019, which claims priority to Chinese Patent Application No. 201810871383.8, filed before the China National Intellectual Property Administration (CNIPA) on Aug. 2, 2018. Both of the aforementioned patent applications are hereby incorporated by reference in their entireties.

TECHNICAL FIELD

The present disclosure relates to an optical imaging lens group, and more specifically, relates to an optical imaging lens group including eight lenses.

BACKGROUND

At present, smart phones have become one of the essential portable electronic products in people's lives. With the rapid development of the mobile phone industry, consumers have increasingly higher requirements for the pixels and image quality of the camera lens assembly mounted on the mobile phone. In theory, by increasing the number of lens elements to compensate various aberrations, the imaging quality of the lens assembly can be greatly improved. However, increasing the number of lens elements will inevitably increase the size of the lens assembly, which is contrary to the current ultra-thin trend of most portable electronic products. Therefore, how to design a lens assembly with higher imaging quality that can be applicable to higher pixel image sensors and stronger image processing technology while the size of the lens assembly remains unchanged or even becomes smaller has become an urgent problem to be solved at present.

SUMMARY

The present disclosure provides an optical imaging lens group that is applicable to portable electronic products and at least solves or partially solves at least one of the above disadvantages of the prior art.

In an aspect, the present disclosure provides an optical imaging lens group which includes, sequentially from an object side to an image side along an optical axis, a first lens, a second lens, a third lens, a fourth lens, a fifth lens, a sixth lens, a seventh lens and an eighth lens, wherein each of the first through the eighth lenses has refractive power. Each of the first lens and the fourth lens may have positive refractive power. The eighth lens may have negative refractive power. An object-side surface of the third lens may be a convex surface, and an image-side surface thereof may be a concave surface. An object-side surface of the fourth lens may be a concave surface, and an image-side surface thereof may be a convex surface.

In one embodiment, a total effective focal length f of the optical imaging lens group, an effective focal length f2 of the second lens, and an effective focal length f3 of the third lens may satisfy $|f/f2|+|f/f3|<1$.

In one embodiment, an effective focal length f1 of the first lens and an effective focal length f4 of the fourth lens may satisfy $1<f1/f4<2.5$.

In one embodiment, a total effective focal length f of the optical imaging lens group, an effective focal length f5 of the fifth lens, and an effective focal length f6 of the sixth lens may satisfy $|f/(f5+f6)|<0.4$.

In one embodiment, an effective focal length f8 of the eighth lens and a total effective focal length f of the optical imaging lens group may satisfy $-1.5<f8/f<-0.5$.

In one embodiment, a radius of curvature R1 of an object-side surface of the first lens and a radius of curvature R2 of an image-side surface of the first lens may satisfy $0.2<R1/R2<0.7$.

In one embodiment, a radius of curvature R5 of an object-side surface of the third lens, and a radius of curvature R6 of an image-side surface of the third lens may satisfy $1 \leq R5/R6 \leq 1.8$.

In one embodiment, a radius of curvature R8 of an image-side surface of the fourth lens and a radius of curvature R7 of an object-side surface of the fourth lens may satisfy $0<R8/R7<0.5$.

In one embodiment, a radius of curvature R12 of an image-side surface of the sixth lens and a radius of curvature R11 of an object-side surface of the sixth lens may satisfy $0.5<R12/R11<1$.

In one embodiment, a total effective focal length f of the optical imaging lens group and a radius of curvature R16 of an image-side surface of the eighth lens may satisfy $0.5<f/R16<1.5$.

In one embodiment, a spaced interval T67 between the sixth lens and the seventh lens along the optical axis and a center thickness CT7 of the seventh lens along the optical axis may satisfy $1.8<T67/CT7<3$.

In one embodiment, a center thickness CT4 of the fourth lens along the optical axis and a distance TTL along the optical axis from an object-side surface of the first lens to an imaging plane of the optical imaging lens group may satisfy $1<CT4/TTL*10<1.5$.

In one embodiment, a distance TTL along the optical axis from an object-side surface of the first lens to an imaging plane of the optical imaging lens group and half of a diagonal length ImgH of an effective pixel area on the imaging plane of the optical imaging lens group may satisfy $TTL/ImgH \leq 1.6$.

In one embodiment, half of a diagonal length ImgH of an effective pixel area on the imaging plane of the optical imaging lens group and a total effective focal length f of the optical imaging lens group may satisfy $ImgH/f<1$.

In one embodiment, a total effective focal length f of the optical imaging lens group and an entrance pupil diameter EPD of the optical imaging lens group may satisfy $f/EPD<1.9$.

The present disclosure employs a plurality of lenses (for example, eight lenses), and the above-mentioned optical imaging lens group has at least one beneficial effect, such as large aperture, low sensitivity, high image quality and the like, by rationally configuring the refractive power, the surface shape, the center thickness of each lens, and the on-axis spaced interval between the lenses and the like.

BRIEF DESCRIPTION OF THE DRAWINGS

Other features, objects, and advantages of the present disclosure will become more apparent from the following detailed description of the non-limiting embodiments with reference to the accompanying drawings. In the drawings:

FIG. 5 illustrates a schematic structural view of an optical imaging lens group according to example 3 of the present disclosure; and FIGS. 6A to 6D illustrate a longitudinal aberration curve, an astigmatic curve, a distortion curve, and a lateral color curve of the optical imaging lens group of the example 3, respectively.

FIG. 9 illustrates a schematic structural view of an optical imaging lens group according to example 5 of the present disclosure; and FIGS. 10A to 10D illustrate a longitudinal aberration curve, an astigmatic curve, a distortion curve, and a lateral color curve of the optical imaging lens group of the example 5, respectively.

FIG. 13 illustrates a schematic structural view of an optical imaging lens group according to example 7 of the present disclosure; and FIGS. 14A to 14D illustrate a longitudinal aberration curve, an astigmatic curve, a distortion curve, and a lateral color curve of the optical imaging lens group of the example 7, respectively.

FIG. 17 illustrates a schematic structural view of an optical imaging lens group according to example 9 of the present disclosure; and FIGS. 18A to 18D illustrate a longitudinal aberration curve, an astigmatic curve, a distortion curve, and a lateral color curve of the optical imaging lens group of the example 9, respectively.

FIG. 19 illustrates a schematic structural view of an optical imaging lens group according to example 10 of the present disclosure; and FIGS. 20A to 20D illustrate a longitudinal aberration curve, an astigmatic curve, a distortion curve, and a lateral color curve of the optical imaging lens group of the example 10, respectively.

DETAILED DESCRIPTION OF EMBODIMENTS

Figure 1:
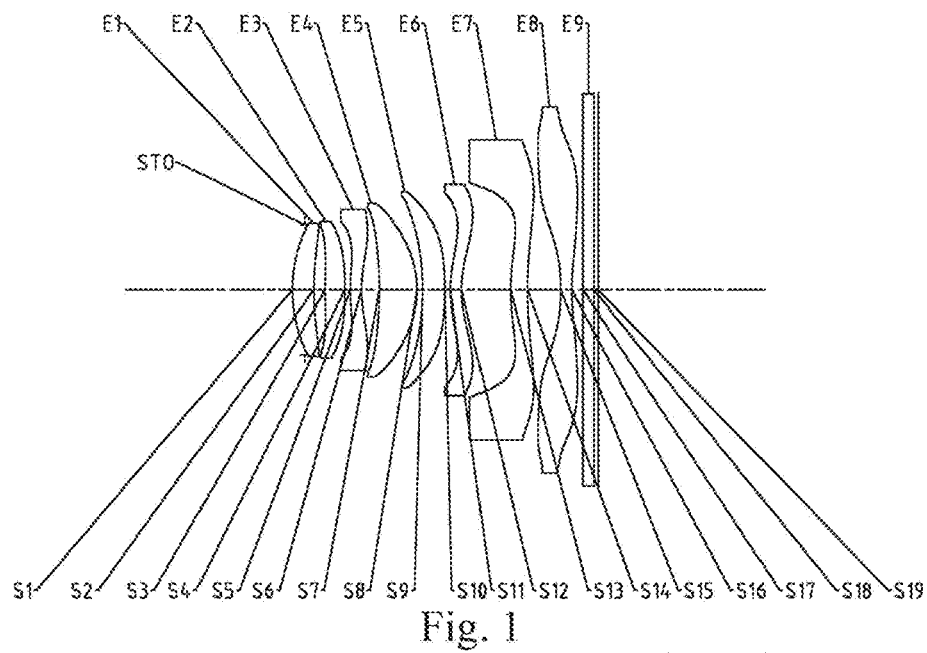
FIG. 1 illustrates a schematic structural view of an optical imaging lens group according to example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples. The features, principles, and other aspects of the present disclosure are described in detail below.

An optical imaging lens group according to an exemplary embodiment of the present disclosure may include, for example, eight lenses (i.e. a first lens, a second lens, a third lens, a fourth lens, a fifth lens, a sixth lens, a seventh lens and an eighth lens). Each of the first to the eighth lenses has refractive power. The eight lenses are arranged sequentially from an object side to an image side along an optical axis, and there may be an air interval between each two adjacent lenses.

In an exemplary embodiment, the first lens may have positive refractive power. The second lens has positive or negative refractive power. The third lens has positive or negative refractive power, an object-side surface thereof may be a convex surface, and an image-side surface thereof may be a concave surface. The fourth lens may have positive refractive power, an object-side surface thereof may be a concave surface, and an image-side surface thereof may be a convex surface. The fifth lens has positive or negative refractive power. The sixth lens has positive or negative refractive power. The seventh lens has positive or negative refractive power. The eighth lens may have negative refractive power.

In an exemplary embodiment, an object-side surface of the first lens may be a convex surface, and an image-side surface thereof may be a concave surface.

In an exemplary embodiment, an object-side surface of the fifth lens may be a concave surface, and an image-side surface thereof may be a convex surface.

In an exemplary embodiment, an object-side surface of the sixth lens may be a convex surface, and an image-side surface thereof may be a concave surface.

In an exemplary embodiment, an object-side surface of the seventh lens may be a convex surface.

In an exemplary embodiment, an object-side surface of the eighth lens may be a concave surface, and an image-side surface thereof may be a concave surface.

In an exemplary embodiment, the optical imaging lens group according to the present disclosure may satisfy $1<f1/f4<2.5$, where f1 is an effective focal length of the first lens, and f4 is an effective focal length of the fourth lens. More specifically, f1 and f4 may further satisfy $1.83 \leq f1/f4 \leq 2.42$. A reasonable distribution of the refractive power of the first lens and the fourth lens can effectively reduce the aberrations of the entire lens system and reduce the sensitivity of the lens system. Reasonable control of the effective focal length of the first lens is beneficial to avoiding the oblique angle of the object-side surface of the first lens being too large, and can make the first lens have better processing. Satisfying the conditional $1<f1/f4<2.5$ is also beneficial to avoiding problems such as poor imaging quality and high sensitivity of the lens system caused by the excessively large aperture of the fourth lens.

In an exemplary embodiment, the optical imaging lens group according to the present disclosure may satisfy $-1.5<f8/f<-0.5$, where f8 is an effective focal length of the eighth lens, and f is a total effective focal length of the optical imaging lens group. More specifically, f8 and f may further satisfy $-1.04 \leq f8/f \leq -0.71$. By reasonably controlling the ratio of the total effective focal length of the lens group to the effective focal length of the eighth lens, the size of the lens system can be kept small while ensuring the lens system has a higher aberration correction capability.

In an exemplary embodiment, the optical imaging lens group according to the present disclosure may satisfy $1 \leq R5/R6 \leq 1.8$, where R5 is a radius of curvature of an object-side surface of the third lens, and R6 is a radius of curvature of an image-side surface of the third lens. More specifically, R5 and R6 may further satisfy $1.00 \leq R5/R6 \leq 1.76$. By reasonably distributing the radii of curvature of the object-side surface and the image-side surface of the third lens, the chromatic aberrations of the lens system can be effectively corrected to realize effective compensation of various aberrations. When the ratio of R5/R6 is too large or too small, it is not conducive to the correction of chromatic aberration of the lens system.

In an exemplary embodiment, the optical imaging lens group according to the present disclosure may satisfy $TTL/ImgH \leq 1.6$, where TTL is a distance along the optical axis from an object-side surface of the first lens to an imaging plane of the optical imaging lens group, and ImgH is half of a diagonal length of an effective pixel area on the imaging plane of the optical imaging lens group. More specifically, TTL and ImgH may further satisfy $1.45 \leq TTL/ImgH \leq 1.59$. Satisfying the conditional $TTL/ImgH \leq 1.6$ can effectively shorten the total size of the lens group, achieve the ultra-thin characteristics and miniaturization of the lens group, so that the imaging lens group can be better adapted to more and more ultra-thin electronic products in the market.

In an exemplary embodiment, the optical imaging lens group according to the present disclosure may satisfy $|f/f2|+|f/f3|<1$, where f is a total effective focal length of the optical imaging lens group, f2 is an effective focal length of the second lens, and f3 is an effective focal length of the third lens. More specifically, f, f2 and f3 may further satisfy $0<|f/f2|+|f/f3|<1$, for example, $0.09 \leq |f/f2|+|f/f3| \leq 0.95$. Reasonably configuring the total effective focal length of the imaging lens group and the effective focal lengths of the second and third lenses can effectively reduce the size of the imaging lens group, and can avoid excessive concentration of the refractive power of the lens system while maintaining the ultra-thin characteristics of the imaging lens group. Satisfying the conditional $|f/f2|+|f/f3|<1$, and cooperating with the rear three lenses, is beneficial to better correcting the aberrations of the lens system.

In an exemplary embodiment, the optical imaging lens group according to the present disclosure may satisfy $|f/(f5+f6)|<0.4$, where f is a total effective focal length of the optical imaging lens group, f5 is an effective focal length of the fifth lens, and f6 is an effective focal length of the sixth lens. More specifically, f, f5 and f6 may further satisfy $0<|f/(f5+f6)|<0.4$, for example, $0.01<|f/(f5+f6)| \leq 0.27$. Reasonably configuring the total effective focal length of the imaging lens group and the effective focal lengths of the fifth and sixth lenses can effectively reduce the size of the imaging lens group, and can avoid excessive concentration of the refractive power of the lens system while maintaining the ultra-thin characteristics of the imaging lens group. Satisfying the conditional $|f/(f5+f6)|<0.4$, and cooperating with the front four lenses, is beneficial to better correcting the aberrations of the lens system.

In an exemplary embodiment, the optical imaging lens group according to the present disclosure may satisfy $0<R8/R7<0.5$, where R7 is a radius of curvature of an object-side surface of the fourth lens, and R8 is a radius of curvature of an image-side surface of the fourth lens. More specifically, R8 and R7 may further satisfy $0.1 \leq R8/R7 \leq 0.27$. By reasonably distributing the radii of curvature of the object-side surface and the image-side surface of the fourth lens, the fourth lens can be well cooperated with the front three lenses to better correct the aberrations and chromatic aberrations of the lens system.

In an exemplary embodiment, the optical imaging lens group according to the present disclosure may satisfy $0.5<R12/R11<1$, where R12 is a radius of curvature of an image-side surface of the sixth lens, and R11 is a radius of curvature of an object-side surface of the sixth lens. More specifically, R12 and R11 may further satisfy $0.61<R12/R11 \leq 0.97$. By reasonably distributing the curvature radii of the object-side surface and the image-side surface of the sixth lens, the astigmatism and coma of the sixth lens and the front lenses can be effectively compensated, so that the lens group can maintain better imaging quality.

In an exemplary embodiment, the optical imaging lens group according to the present disclosure may satisfy f/EPD<1.9, where f is a total effective focal length of the optical imaging lens group, and EPD is an entrance pupil diameter of the optical imaging lens group. More specifically, f and EPD may further satisfy $1.53 \leq f/EPD \leq 1.82$. Controlling the ratio range of f to EPD can effectively increase the amount of light entering the lens group per unit time, so that the lens group has a relatively high relative illuminance, which can improve the imaging quality of the lens group in a dark environment and make the lens group more practical.

In an exemplary embodiment, the optical imaging lens group according to the present disclosure may satisfy 1.8<T67/CT7<3, where T67 is a spaced interval between the sixth lens and the seventh lens along the optical axis, and CT7 is a center thickness of the seventh lens along the optical axis. More specifically, T67 and CT7 may further satisfy 1.95<T67/CT7<2.97. By reasonably controlling the air gap between the sixth lens and the seventh lens and the center thickness of the seventh lens, the risk of ghost images generated by the lens system can be effectively reduced, and the size of the lens group can be reduced.

In an exemplary embodiment, the optical imaging lens group according to the present disclosure may satisfy 1<CT4/TTL*10<1.5, where CT4 is a center thickness of the fourth lens along the optical axis, and TTL is a distance along the optical axis from an object-side surface of the first lens to an imaging plane of the optical imaging lens group. More specifically, CT4 and TTL may further satisfy 1.20<CT4/TTL*10<1.49. Reasonable control of the center thickness of the fourth lens helps keep the lens system miniaturized and reduces the risk of ghost images caused by the lens system. The fourth lens is used in conjunction with the front three lenses, which can effectively reduce the chromatic aberrations of the lens system. Satisfying the conditional 1<CT4/TTL*10<1.5 may also avoid processing difficulties due to the thinness of the fourth lens.

In an exemplary embodiment, the optical imaging lens group according to the present disclosure may satisfy 0.2<R1/R2<0.7, where R1 is a radius of curvature of an object-side surface of the first lens, and R2 is a radius of curvature of an image-side surface of the first lens. More specifically, R1 and R2 may further satisfy $0.42 \leq R1/R2 \leq 0.55$. By reasonably controlling the curvature radii of the object-side surface and image-side surface of the first lens, the size of lens system can be effectively reduced. Meanwhile, it is conducive to the reasonable distribution of the refractive power of the lens system, so as not to be excessively concentrated on the first lens, which in turn facilitates the aberration correction of the subsequent lenses.

In an exemplary embodiment, the optical imaging lens group according to the present disclosure may satisfy 0.5<f/R16<1.5, where f is a total effective focal length of the optical imaging lens group, and R16 is a radius of curvature of an image-side surface of the eighth lens. More specifically, f and R16 may further satisfy $0.86 \leq f/R16 \leq 1.18$. By controlling the ratio of the total effective focal length of the lens system to the curvature radius of the image-side surface of the eighth lens in a reasonable range, the lens system can be made to have higher aberration correction ability and better processability while maintaining miniaturization.

In an exemplary embodiment, the optical imaging lens group according to the present disclosure may satisfy ImgH/f<1, where ImgH is half of a diagonal length of an effective pixel area on the imaging plane of the optical imaging lens group, and f is a total effective focal length of the optical imaging lens group. More specifically, ImgH and f may further satisfy $0.89 \leq ImgH/f \leq 0.98$. The combination of the conditional ImgH/f<1 and the conditional $TTL/ImgH \leq 1.6$ enables the lens system to obtain ultra-thin characteristics while supporting a larger full-field angle FOV, thereby having a wider imaging range. In addition, by appropriately adjusting the image height and the total effective focal length of the lens system, it is also conducive to achieving a larger FOV.

In an exemplary embodiment, the above-mentioned optical imaging lens group may further include a stop to improve the image quality of the lens group. Optionally, the stop may be disposed between the object side and the first lens.

Optionally, the above-mentioned optical imaging lens group may further include an optical filter for correcting the color deviation and/or a protective glass for protecting the photosensitive element located on an imaging plane.

The optical imaging lens group according to the above embodiments of the present disclosure may employ a plurality of lenses, such as eight lenses as described above. By properly configuring the refractive power of each lens, the surface shape, the center thickness of each lens, and spaced intervals along the optical axis between the lenses, the size and the sensitivity of the lens group may be effectively reduced, and the workability of the lens group may be improved, such that the optical imaging lens group is more advantageous for production processing and may be applied to portable electronic products. The optical imaging lens group configured as described above may also have beneficial effects such as large aperture, low sensitivity, high image quality, and the like.

In the embodiments of the present disclosure, the lenses are mostly aspheric lenses. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality.

However, it will be understood by those skilled in the art that the number of lenses constituting the optical imaging lens assembly may be varied to achieve the various results and advantages described in this specification without departing from the technical solution claimed by the present disclosure. For example, although the embodiment is described by taking eight lenses as an example, the optical imaging lens assembly is not limited to include eight lenses. The optical imaging lens group may also include other numbers of lenses if desired. Some specific examples of an optical imaging lens group applicable to the above embodiment will be further described below with reference to the accompanying drawings.

Example 1

An optical imaging lens group according to example 1 of the present disclosure is described below with reference to FIG. 1 to FIG. 2D. FIG. 1 shows a schematic structural view of the optical imaging lens group according to example 1 of the present disclosure.

As shown in FIG. 1, the optical imaging lens group according to an exemplary embodiment of the present disclosure includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side along an optical axis.

The first lens E1 has positive refractive power, an object-side surface S1 thereof is a convex surface, and an image-side surface S2 thereof is a concave surface. The second lens E2 has positive refractive power, an object-side surface S3 thereof is a convex surface, and an image-side surface S4 thereof is a convex surface. The third lens E3 has negative refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a concave surface, and an image-side surface S10 thereof is a convex surface. The sixth lens E6 has negative refractive power, an object-side surface S11 thereof is a convex surface, and an image-side surface S12 thereof is a concave surface. The seventh lens E7 has positive refractive power, an object-side surface S13 thereof is a convex surface, and an image-side surface S14 thereof is a concave surface. The eighth lens E8 has negative refractive power, an object-side surface S15 thereof is a concave surface, and an image-side surface S16 thereof is a concave surface. The optical filter E9 has an object-side surface S17 and an image-side surface S18. Light from an object sequentially passes through the respective surfaces S1 to S18 and is finally imaged on the imaging plane S19.

Table 1 shows surface type, radius of curvature, thickness, material and conic coefficient of each lens of the optical imaging lens group in example 1, wherein the units for the radius of curvature and the thickness are millimeter (mm).

TABLE 1

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| STO | Spherical | Infinite | −0.2228 | | | |
| S1 | Aspheric | 2.5672 | 0.3886 | 1.59 | 68.3 | 0.5120 |
| S2 | Aspheric | 4.6537 | 0.2069 | | | 4.1873 |
| S3 | Aspheric | 14.0343 | 0.3559 | 1.49 | 70.3 | 80.0000 |
| S4 | Aspheric | −6.5596 | 0.1000 | | | −28.7651 |
| S5 | Aspheric | 3.7924 | 0.2000 | 1.76 | 27.6 | 2.4813 |
| S6 | Aspheric | 2.2056 | 0.3244 | | | −0.1677 |
| S7 | Aspheric | −6.6682 | 0.6815 | 1.62 | 60.3 | −1.1205 |
| S8 | Aspheric | −1.7869 | 0.1000 | | | 0.0039 |
| S9 | Aspheric | −5.4015 | 0.4047 | 1.69 | 50.5 | −1.1101 |
| S10 | Aspheric | −6.2993 | 0.1000 | | | −5.6816 |
| S11 | Aspheric | 2.2934 | 0.2000 | 1.70 | 30.3 | 0.3333 |
| S12 | Aspheric | 2.0014 | 0.8813 | | | −0.0413 |
| S13 | Aspheric | 4.0554 | 0.3037 | 1.55 | 56.1 | −7.2800 |
| S14 | Aspheric | 8.7342 | 0.6008 | | | 7.3945 |
| S15 | Aspheric | −4.2500 | 0.2000 | 1.65 | 44.7 | −0.1107 |
| S16 | Aspheric | 3.6956 | 0.2024 | | | −21.6593 |
| S17 | Spherical | Infinite | 0.2000 | 1.52 | 64.2 | |
| S18 | Spherical | Infinite | 0.0811 | | | |
| S19 | Spherical | Infinite | | | | |

As can be seen from Table 1, the object-side surface and the image-side surface of any one of the first lens E1 to the eighth lens E8 are aspheric. In this example, the surface shape x of each aspheric lens may be defined by using, but not limited to, the following aspheric formula:

$$x = \frac{ch^2}{1+\sqrt{1-(k+1)c^2h^2}} + \sum A_i h^i \qquad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient (given in the above Table 1); Ai is a correction coefficient for the i-th order of the aspheric surface. Table 2 below shows high-order coefficients A4, A6, A8, A10, A12, A14, A16, A18 and A20 applicable to each aspheric surface S1 to S16 in example 1.

senting deviations of different image heights on an imaging plane after light passes through the lens group. It can be seen from FIG. 2A to FIG. 2D that the optical imaging lens group provided in example 1 may achieve good image quality.

TABLE 2

| Surface number | A4 | A6 | A8 | A10 | A12 |
|---|---|---|---|---|---|
| S1 | −1.0280E−02 | 2.7364E−02 | −1.4701E−01 | 4.3095E−01 | −7.5024E−01 |
| S2 | −2.3710E−02 | −9.3740E−02 | 4.1107E−01 | −1.1358E+00 | 2.0098E+00 |
| S3 | −5.6950E−02 | −6.4850E−02 | 1.0650E−01 | −2.2168E−01 | 4.8260E−01 |
| S4 | −5.4360E−02 | −1.2379E−01 | 2.9279E−01 | −2.9980E−01 | 4.6144E−02 |
| S5 | −1.6956E−01 | −1.0788E−01 | 2.4918E−01 | −5.1990E−02 | −5.2328E−01 |
| S6 | −1.4037E−01 | −7.6110E−02 | 2.8774E−01 | −4.1699E−01 | 3.5529E−01 |
| S7 | 7.3610E−03 | −3.0000E−04 | −3.0250E−02 | 8.1011E−02 | −9.1450E−02 |
| S8 | −2.9500E−03 | 7.0080E−02 | −1.1262E−01 | 1.1892E−01 | −7.3050E−02 |
| S9 | −4.8300E−02 | 8.1461E−02 | −1.1878E−01 | 1.2531E−01 | −9.1080E−02 |
| S10 | −7.4920E−02 | 3.9225E−02 | −4.9520E−02 | 4.9562E−02 | −3.3570E−02 |
| S11 | −1.2218E−01 | 4.5250E−02 | −6.6940E−02 | 5.8834E−02 | −3.0820E−02 |
| S12 | −1.2002E−01 | 4.8185E−02 | −6.3390E−02 | 5.6130E−02 | −3.0240E−02 |
| S13 | −1.6940E−02 | −2.3750E−02 | 2.6262E−02 | −3.2510E−02 | 2.3502E−02 |
| S14 | 1.3438E−02 | −2.1550E−02 | 1.0266E−02 | −3.2700E−03 | 7.6200E−04 |
| S15 | −8.1860E−02 | 5.2793E−02 | −1.0150E−02 | 1.0700E−04 | 2.6300E−04 |
| S16 | −5.0240E−02 | 2.4566E−02 | −6.4500E−03 | 8.2300E−04 | −2.6000E−05 |

| Surface number | A14 | A16 | A18 | A20 |
|---|---|---|---|---|
| S1 | 8.0456E−01 | −5.2180E−01 | 1.8752E−01 | −2.8790E−02 |
| S2 | −2.2577E+00 | 1.5581E+00 | −6.0392E−01 | 1.0062E−01 |
| S3 | −6.9405E−01 | 5.8947E−01 | −2.7196E−01 | 5.2854E−02 |
| S4 | 2.2996E−01 | −2.5776E−01 | 1.1707E−01 | −2.0150E−02 |
| S5 | 9.0138E−01 | −6.9936E−01 | 2.7324E−01 | −4.3760E−02 |
| S6 | −1.9303E−01 | 6.8360E−02 | −1.4760E−02 | 1.4750E−03 |
| S7 | 3.8366E−02 | 2.9820E−03 | −6.3200E−03 | 1.2220E−03 |
| S8 | 2.1871E−02 | −6.0000E−04 | −1.1600E−03 | 1.7500E−04 |
| S9 | 4.3698E−02 | −1.3140E−02 | 2.2490E−03 | −1.7000E−04 |
| S10 | 1.5254E−02 | −4.5700E−03 | 8.2900E−04 | −6.9000E−05 |
| S11 | 1.0115E−02 | −2.2200E−03 | 3.3000E−04 | −2.6000E−05 |
| S12 | 9.9810E−03 | −2.0200E−03 | 2.3300E−04 | −1.2000E−05 |
| S13 | −1.0640E−02 | 2.9930E−03 | −4.8000E−04 | 3.4300E−05 |
| S14 | −1.4000E−04 | 1.7200E−05 | −1.3000E−06 | 3.9400E−08 |
| S15 | −4.6000E−05 | 3.7000E−06 | −1.5000E−07 | 2.3800E−09 |
| S16 | −7.1000E−06 | 1.0600E−06 | −6.0000E−08 | 1.2500E−09 |

Table 3 shows effective focal lengths f1 to f8 of respective lens, a total effective focal length f of the optical imaging lens group, a distance TTL along the optical axis from the object-side surface S1 of the first lens E1 to the imaging plane S19, and half of a diagonal length ImgH of an effective pixel area on the imaging plane S19 in example 1.

TABLE 3

| f1 (mm) | 9.01 | f7 (mm) | 13.56 |
|---|---|---|---|
| f2 (mm) | 9.25 | f8 (mm) | −3.00 |
| f3 (mm) | −7.33 | f (mm) | 3.87 |
| f4 (mm) | 3.73 | TTL (mm) | 5.53 |
| f5 (mm) | −67.59 | ImgH (mm) | 3.56 |
| f6 (mm) | −31.16 | | |

Figure 2A:
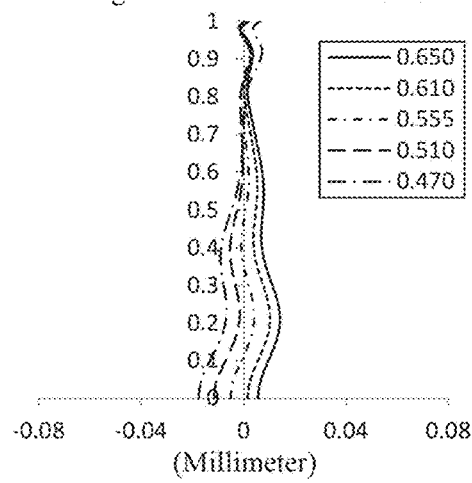
FIGS. 2A to 2D illustrate a longitudinal aberration curve, an astigmatic curve, a distortion curve, and a lateral color curve of the optical imaging lens group of the example 1, respectively.
Figure 2B:
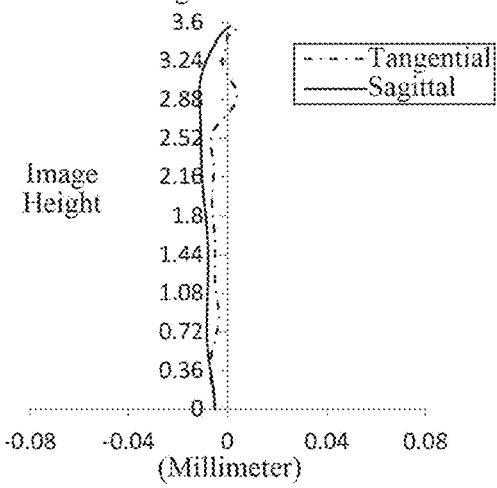
Figure 2C:
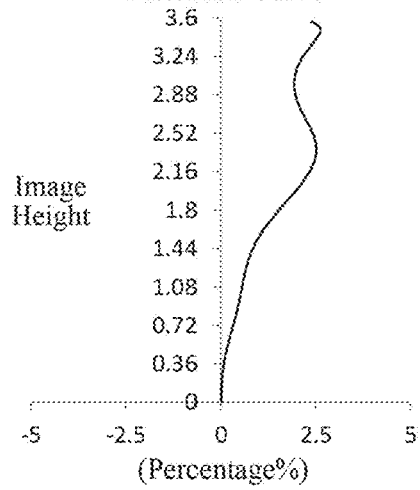
Figure 2D:
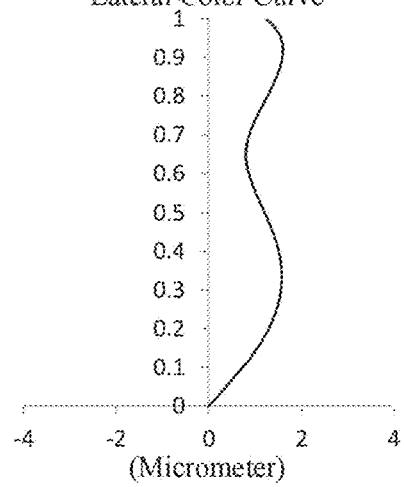

FIG. 2A illustrates a longitudinal aberration curve of the optical imaging lens group according to example 1, representing deviations of focal points converged by light of different wavelengths after passing through the lens group. FIG. 2B illustrates an astigmatic curve of the optical imaging lens group according to example 1, representing a curvature of a tangential plane and a curvature of a sagittal plane. FIG. 2C illustrates a distortion curve of the optical imaging lens group according to example 1, representing amounts of distortion corresponding to different image heights. FIG. 2D illustrates a lateral color curve of the optical imaging lens group according to example 1, repre- Example 2

Figure 3:
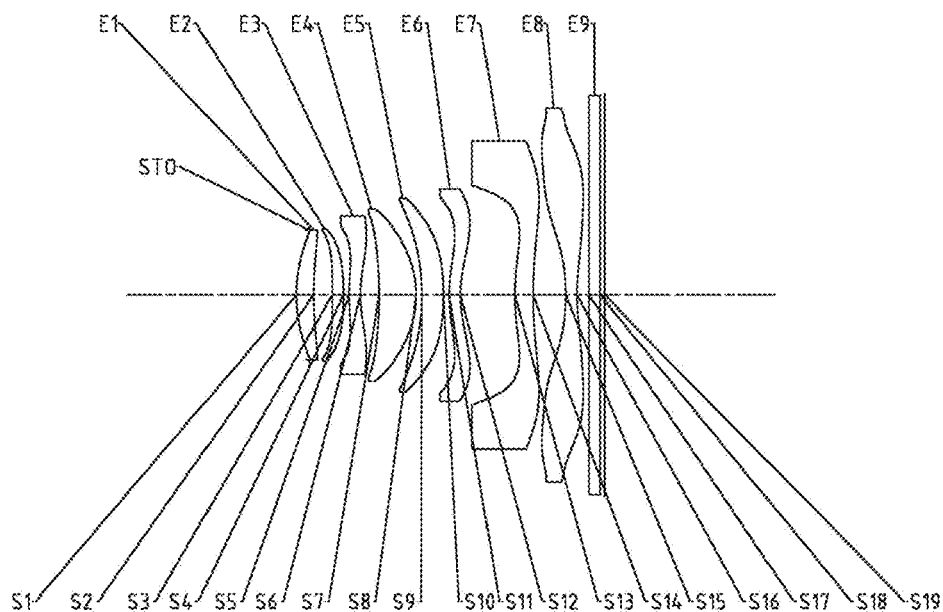
FIG. 3 illustrates a schematic structural view of an optical imaging lens group according to example 2 of the present disclosure.

An optical imaging lens group according to example 2 of the present disclosure is described below with reference to FIG. 3 to FIG. 4D. In this example and the following examples, for the purpose of brevity, the description of parts similar to those in example 1 will be omitted. FIG. 3 shows a schematic structural view of the optical imaging lens group according to example 2 of the present disclosure.

As shown in FIG. 3, the optical imaging lens group according to an exemplary embodiment of the present disclosure includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side along an optical axis.

The first lens E1 has positive refractive power, an object-side surface S1 thereof is a convex surface, and an image-side surface S2 thereof is a concave surface. The second lens E2 has positive refractive power, an object-side surface S3 thereof is a concave surface, and an image-side surface S4 thereof is a convex surface. The third lens E3 has negative refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has positive refractive power, an object-side surface S9 thereof is a concave surface, and an image-side surface S10 thereof is a convex surface. The sixth lens E6 has negative refractive power, an object-side surface S11 thereof is a convex surface, and an image-side surface S12 thereof is a concave surface. The seventh lens E7 has positive refractive power, an object-side surface S13 thereof is a convex surface, and an image-side surface S14 thereof is a concave surface. The eighth lens E8 has negative refractive power, an object-side surface S15 thereof is a concave surface, and an image-side surface S16 thereof is a concave surface. The optical filter E9 has an object-side surface S17 and an image-side surface S18. Light from an object sequentially passes through the respective surfaces S1 to S18 and is finally imaged on the imaging plane S19.

Table 4 shows surface type, radius of curvature, thickness, material and conic coefficient of each lens of the optical imaging lens group in example 2, wherein the units for the radius of curvature and the thickness are millimeter (mm). Table 5 shows high-order coefficients applicable to each aspheric surface in example 2, wherein the surface shape of each aspheric surface may be defined by the formula (1) given in the above example 1. Table 6 shows effective focal lengths f1 to f8 of respective lens, a total effective focal length f of the optical imaging lens group, a distance TTL along the optical axis from the object-side surface S1 of the first lens E1 to the imaging plane S19, and half of a diagonal length ImgH of an effective pixel area on the imaging plane S19 in example 2.

TABLE 4

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| STO | Spherical | Infinite | −0.2294 | | | |
| S1 | Aspheric | 2.6218 | 0.3072 | 1.59 | 68.3 | 0.2916 |
| S2 | Aspheric | 5.9103 | 0.3302 | | | 8.3890 |
| S3 | Aspheric | −92.6790 | 0.2000 | 1.49 | 70.3 | −80.0000 |
| S4 | Aspheric | −5.2786 | 0.1000 | | | −6.1248 |
| S5 | Aspheric | 3.9373 | 0.2000 | 1.76 | 27.6 | 2.8199 |
| S6 | Aspheric | 2.2358 | 0.3330 | | | −0.0947 |
| S7 | Aspheric | −6.8841 | 0.6568 | 1.62 | 60.3 | −0.7036 |
| S8 | Aspheric | −1.7717 | 0.1000 | | | 0.0202 |
| S9 | Aspheric | −4.3509 | 0.3854 | 1.69 | 50.5 | −1.6319 |
| S10 | Aspheric | −4.3539 | 0.1000 | | | −6.7800 |
| S11 | Aspheric | 2.6157 | 0.2000 | 1.70 | 30.3 | 0.6879 |
| S12 | Aspheric | 2.1086 | 0.9575 | | | 0.0133 |
| S13 | Aspheric | 4.1202 | 0.3227 | 1.55 | 56.1 | −8.1192 |
| S14 | Aspheric | 8.5977 | 0.5786 | | | 6.9902 |
| S15 | Aspheric | −4.2509 | 0.2000 | 1.65 | 44.7 | 0.0872 |
| S16 | Aspheric | 3.7677 | 0.2110 | | | −17.1094 |
| S17 | Spherical | Infinite | 0.2000 | 1.52 | 64.2 | |
| S18 | Spherical | Infinite | 0.0811 | | | |
| S19 | Spherical | Infinite | | | | |

TABLE 5

| Surface number | A4 | A6 | A8 | A10 | A12 |
|---|---|---|---|---|---|
| S1 | −9.9200E−03 | 2.3219E−02 | −1.4075E−01 | 4.2585E−01 | −7.5375E−01 |
| S2 | −2.2460E−02 | −7.2010E−02 | 3.7154E−01 | −1.1638E+00 | 2.2815E+00 |
| S3 | −7.1790E−02 | −6.3110E−02 | 8.5277E−02 | −1.8760E−01 | 5.7136E−01 |
| S4 | −5.5650E−02 | −1.7299E−01 | 4.2793E−01 | −6.3286E−01 | 6.6666E−01 |
| S5 | −1.6281E−01 | −1.2739E−01 | 3.4505E−01 | −3.3309E−01 | −3.2510E−02 |
| S6 | −1.4197E−01 | −7.6040E−02 | 2.8741E−01 | −4.2081E−01 | 3.6511E−01 |
| S7 | 1.2552E−02 | −2.2170E−02 | 2.8051E−02 | −2.9610E−02 | 3.9039E−02 |
| S8 | −1.0600E−03 | 6.0541E−02 | −8.6660E−02 | 8.1271E−02 | −4.4970E−02 |
| S9 | −5.6670E−02 | 9.3043E−02 | −1.2062E−01 | 1.1230E−01 | −7.3620E−02 |
| S10 | −7.3060E−02 | 4.4646E−02 | −6.3450E−02 | 7.0056E−02 | −5.3190E−02 |
| S11 | −1.2031E−01 | 4.5260E−02 | −7.3560E−02 | 7.9470E−02 | −5.3980E−02 |
| S12 | −1.2877E−01 | 5.0322E−02 | −5.8640E−02 | 5.4255E−02 | −3.2380E−02 |
| S13 | −2.4250E−02 | −4.9000E−03 | −3.2600E−03 | −1.4400E−03 | 2.0690E−03 |
| S14 | 4.4080E−03 | −8.9900E−03 | 7.8600E−04 | 8.5500E−04 | −3.5000E−04 |
| S15 | −7.1120E−02 | 4.8815E−02 | −1.0620E−02 | 6.5600E−04 | 1.2300E−04 |
| S16 | −5.0900E−02 | 2.4782E−02 | −6.7700E−03 | 9.7800E−04 | −6.2000E−05 |

| Surface number | A14 | A16 | A18 | A20 |
|---|---|---|---|---|
| S1 | 7.9729E−01 | −4.9667E−01 | 1.6598E−01 | −2.2760E−02 |
| S2 | −2.8187E+00 | 2.1246E+00 | −8.9317E−01 | 1.6064E−01 |
| S3 | −1.0405E+00 | 1.0193E+00 | −5.1570E−01 | 1.0692E−01 |

TABLE 5-continued

| | | | | |
|---|---|---|---|---|
| S4 | −5.7120E−01 | 3.7843E−01 | −1.6021E−01 | 3.0516E−02 |
| S5 | 3.6711E−01 | −3.4579E−01 | 1.4405E−01 | −2.3810E−02 |
| S6 | −2.0119E−01 | 7.1449E−02 | −1.5260E−02 | 1.5010E−03 |
| S7 | −5.3230E−02 | 4.0122E−02 | −1.4360E−02 | 1.9500E−03 |
| S8 | 1.2991E−02 | −1.4600E−03 | 1.0600E−04 | −5.4000E−05 |
| S9 | 3.2966E−02 | −9.5700E−03 | 1.6360E−03 | −1.3000E−04 |
| S10 | 2.7063E−02 | −8.8700E−03 | 1.6910E−03 | −1.4000E−04 |
| S11 | 2.3631E−02 | −6.6800E−03 | 1.1180E−03 | −8.4000E−05 |
| S12 | 1.2108E−02 | −2.8000E−03 | 3.6900E−04 | −2.1000E−05 |
| S13 | −1.1600E−03 | 4.1700E−04 | −9.2000E−05 | 8.5600E−06 |
| S14 | 5.3700E−05 | −3.1000E−06 | −3.6000E−08 | 7.4200E−09 |
| S15 | −2.7000E−05 | 2.2500E−06 | −8.7000E−08 | 1.2600E−09 |
| S16 | −2.4000E−06 | 7.2300E−07 | −4.7000E−08 | 1.0500E−09 |

TABLE 6

| | | | |
|---|---|---|---|
| f1 (mm) | 7.67 | f7 (mm) | 14.13 |
| f2 (mm) | 11.51 | f8 (mm) | −3.03 |
| f3 (mm) | −7.17 | f (mm) | 3.88 |
| f4 (mm) | 3.66 | TTL (mm) | 5.46 |
| f5 (mm) | 179.16 | ImgH (mm) | 3.56 |
| f6 (mm) | −18.47 | | |

Figure 4A:
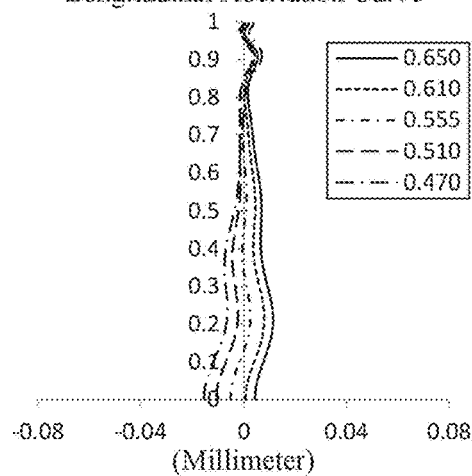
FIGS. 4A to 4D illustrate a longitudinal aberration curve, an astigmatic curve, a distortion curve, and a lateral color curve of the optical imaging lens group of the example 2, respectively.
Figure 4B:
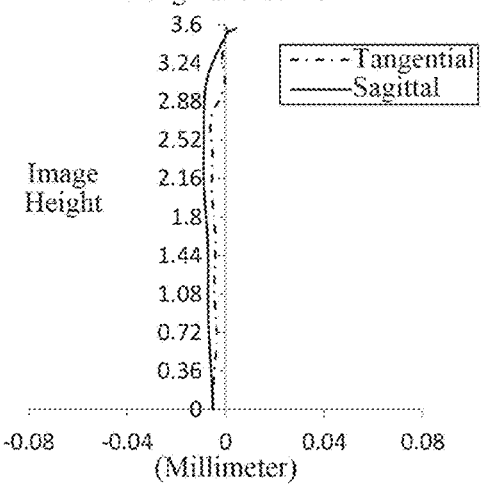
Figure 4C:
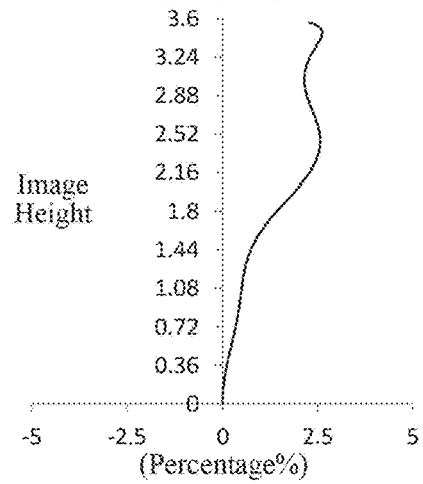
Figure 4D:
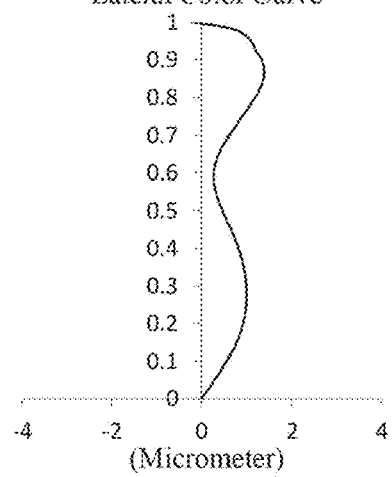

FIG. 4A illustrates a longitudinal aberration curve of the optical imaging lens group according to example 2, representing deviations of focal points converged by light of different wavelengths after passing through the lens group. FIG. 4B illustrates an astigmatic curve of the optical imaging lens group according to example 2, representing a curvature of a tangential plane and a curvature of a sagittal plane. FIG. 4C illustrates a distortion curve of the optical imaging lens group according to example 2, representing amounts of distortion corresponding to different image heights. FIG. 4D illustrates a lateral color curve of the optical imaging lens group according to example 2, representing deviations of different image heights on an imaging plane after light passes through the lens group. It can be seen from FIG. 4A to FIG. 4D that the optical imaging lens group provided in example 2 may achieve good image quality.

Example 3

An optical imaging lens group according to example 3 of the present disclosure is described below with reference to FIG. 5 to FIG. 6D. FIG. 5 shows a schematic structural view of the optical imaging lens group according to example 3 of the present disclosure.

As shown in FIG. 5, the optical imaging lens group according to an exemplary embodiment of the present disclosure includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side along an optical axis.

The first lens E1 has positive refractive power, an object-side surface S1 thereof is a convex surface, and an image-side surface S2 thereof is a concave surface. The second lens E2 has positive refractive power, an object-side surface S3 thereof is a convex surface, and an image-side surface S4 thereof is a convex surface. The third lens E3 has negative refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a concave surface, and an image-side surface S10 thereof is a convex surface. The sixth lens E6 has positive refractive power, an object-side surface S11 thereof is a convex surface, and an image-side surface S12 thereof is a concave surface. The seventh lens E7 has positive refractive power, an object-side surface S13 thereof is a convex surface, and an image-side surface S14 thereof is a convex surface. The eighth lens E8 has negative refractive power, an object-side surface S15 thereof is a concave surface, and an image-side surface S16 thereof is a concave surface. The optical filter E9 has an object-side surface S17 and an image-side surface S18. Light from an object sequentially passes through the respective surfaces S1 to S18 and is finally imaged on the imaging plane S19.

Table 7 shows surface type, radius of curvature, thickness, material and conic coefficient of each lens of the optical imaging lens group in example 3, wherein the units for the radius of curvature and the thickness are millimeter (mm). Table 8 shows high-order coefficients applicable to each aspheric surface in example 3, wherein the surface shape of each aspheric surface may be defined by the formula (1) given in the above example 1. Table 9 shows effective focal lengths f1 to f8 of respective lens, a total effective focal length f of the optical imaging lens group, a distance TTL along the optical axis from the object-side surface S1 of the first lens E1 to the imaging plane S19, and half of a diagonal length ImgH of an effective pixel area on the imaging plane S19 in example 3.

TABLE 7

| | | | | Material | | |
|---|---|---|---|---|---|---|
| Surface number | Surface type | Radius of curvature | Thickness | Refractive index | Abbe number | Conic coefficient |
| OBJ | Spherical | Infinite | Infinite | | | |
| STO | Spherical | Infinite | −0.2265 | | | |
| S1 | Aspheric | 2.4776 | 0.2492 | 1.59 | 68.3 | 0.3444 |
| S2 | Aspheric | 5.0411 | 0.3254 | | | 7.5151 |
| S3 | Aspheric | 32.6803 | 0.2016 | 1.49 | 70.3 | 80.0000 |

TABLE 7-continued

| Surface number | Surface type | Radius of curvature | Thickness | Material Refractive index | Material Abbe number | Conic coefficient |
|---|---|---|---|---|---|---|
| S4 | Aspheric | −6.8710 | 0.1000 | | | −8.2850 |
| S5 | Aspheric | 3.4426 | 0.2000 | 1.76 | 27.6 | 2.3799 |
| S6 | Aspheric | 2.1041 | 0.3026 | | | −0.1725 |
| S7 | Aspheric | −8.0642 | 0.6816 | 1.62 | 60.3 | −5.1951 |
| S8 | Aspheric | −1.8216 | 0.1000 | | | 0.0244 |
| S9 | Aspheric | −5.5874 | 0.3644 | 1.69 | 50.5 | −3.3021 |
| S10 | Aspheric | −9.7303 | 0.1000 | | | −3.9254 |
| S11 | Aspheric | 2.1067 | 0.2000 | 1.70 | 30.3 | 0.2257 |
| S12 | Aspheric | 2.0445 | 0.8480 | | | −0.0123 |
| S13 | Aspheric | 4.9159 | 0.3033 | 1.55 | 56.1 | −2.4427 |
| S14 | Aspheric | −100.0000 | 0.5758 | | | −80.0000 |
| S15 | Aspheric | −3.8710 | 0.2000 | 1.65 | 44.7 | −0.1256 |
| S16 | Aspheric | 3.1307 | 0.2249 | | | −20.0275 |
| S17 | Spherical | Infinite | 0.2000 | 1.52 | 64.2 | |
| S18 | Spherical | Infinite | 0.0811 | | | |
| S19 | Spherical | Infinite | | | | |

TABLE 8

| Surface number | A4 | A6 | A8 | A10 | A12 |
|---|---|---|---|---|---|
| S1 | −8.6800E−03 | 1.3981E−02 | −1.1821E−01 | 3.9506E−01 | −7.1759E−01 |
| S2 | −2.0870E−02 | −9.3730E−02 | 4.4469E−01 | −1.3017E+00 | 2.4306E+00 |
| S3 | −6.6820E−02 | −6.7530E−02 | 8.1223E−02 | −1.9553E−01 | 6.1152E−01 |
| S4 | −5.3420E−02 | −1.7338E−01 | 3.9053E−01 | −4.7060E−01 | 3.1622E−01 |
| S5 | −1.6806E−01 | −1.1370E−01 | 2.7120E−01 | −1.3036E−01 | −3.5261E−01 |
| S6 | −1.4119E−01 | −7.8220E−02 | 2.9082E−01 | −4.2187E−01 | 3.6006E−01 |
| S7 | 7.5380E−03 | −4.4500E−03 | −6.9900E−02 | 3.6073E−02 | −3.6010E−02 |
| S8 | −5.7200E−03 | 7.0437E−02 | −1.1571E−01 | 1.2704E−01 | −8.2380E−02 |
| S9 | −4.0290E−02 | 7.2861E−02 | −1.2240E−01 | 1.4682E−01 | −1.1783E−01 |
| S10 | −8.0740E−02 | 4.6066E−02 | −5.9490E−02 | 6.1597E−02 | −4.3540E−02 |
| S11 | −1.2777E−01 | 4.9183E−02 | −7.3930E−02 | 7.1688E−02 | −4.7640E−02 |
| S12 | −1.0297E−01 | 2.4036E−02 | −3.2900E−02 | 2.9094E−02 | −1.5170E−02 |
| S13 | −9.9000E−04 | −2.3680E−02 | 2.8160E−03 | −6.7000E−04 | 1.4600E−04 |
| S14 | 5.6442E−02 | −4.1690E−02 | 1.4346E−02 | −2.4100E−03 | 4.5300E−05 |
| S15 | −8.1300E−02 | 4.5088E−02 | −3.1300E−03 | −2.7700E−03 | 9.2700E−04 |
| S16 | −4.6040E−02 | 1.7096E−02 | −1.1500E−03 | −1.2100E−03 | 4.4100E−04 |

| Surface number | A14 | A16 | A18 | A20 |
|---|---|---|---|---|
| S1 | 7.6890E−01 | −4.8731E−01 | 1.6914E−01 | −2.5130E−02 |
| S2 | −2.8739E+00 | 2.0743E+00 | −8.3274E−01 | 1.4220E−01 |
| S3 | −1.0719E+00 | 1.0050E+00 | −4.8662E−01 | 9.6256E−02 |
| S4 | −1.1806E−01 | 3.2364E−02 | −1.6310E−02 | 5.2610E−03 |
| S5 | 6.7422E−01 | −5.1837E−01 | 1.9500E−01 | −2.9610E−02 |
| S6 | −1.9512E−01 | 6.8430E−02 | −1.4520E−02 | 1.4250E−03 |
| S7 | −7.3700E−03 | 2.6078E−02 | −1.2640E−02 | 1.9410E−03 |
| S8 | 2.8268E−02 | −3.6800E−03 | −2.0000E−04 | 4.0500E−05 |
| S9 | 6.0813E−02 | −1.9300E−02 | 3.4450E−03 | −2.7000E−04 |
| S10 | 2.0599E−02 | −6.3600E−03 | 1.1730E−03 | −9.8000E−05 |
| S11 | 2.2307E−02 | −7.1200E−03 | 1.3570E−03 | −1.1000E−04 |
| S12 | 4.9770E−03 | −1.1000E−03 | 1.5800E−04 | −1.1000E−05 |
| S13 | −4.1000E−04 | 3.5600E−04 | −1.1000E−04 | 1.2400E−05 |
| S14 | 4.7200E−05 | −6.7000E−06 | 3.1500E−07 | −2.1000E−09 |
| S15 | −1.4000E−04 | 1.1200E−05 | −4.8000E−07 | 8.7100E−09 |
| S16 | −7.3000E−05 | 6.6700E−06 | −3.2000E−07 | 6.3400E−09 |

TABLE 9

| f1 (mm) | 7.92 | f7 (mm) | 8.59 |
|---|---|---|---|
| f2 (mm) | 11.70 | f8 (mm) | −2.62 |
| f3 (mm) | −7.61 | f (mm) | 3.69 |
| f4 (mm) | 3.63 | TTL (mm) | 5.26 |
| f5 (mm) | −19.82 | ImgH (mm) | 3.56 |
| f6 (mm) | 300.00 | | |

FIG. 6A illustrates a longitudinal aberration curve of the optical imaging lens group according to example 3, representing deviations of focal points converged by light of different wavelengths after passing through the lens group. FIG. 6B illustrates an astigmatic curve of the optical imaging lens group according to example 3, representing a curvature of a tangential plane and a curvature of a sagittal plane. FIG. 6C illustrates a distortion curve of the optical imaging lens group according to example 3, representing amounts of distortion corresponding to different image heights. FIG. 6D illustrates a lateral color curve of the optical imaging lens group according to example 3, representing deviations of different image heights on an imaging plane after light passes through the lens group. It can be seen from FIG. 6A to FIG. 6D that the optical imaging lens group provided in example 3 may achieve good image quality.

Example 4

Figure 7:
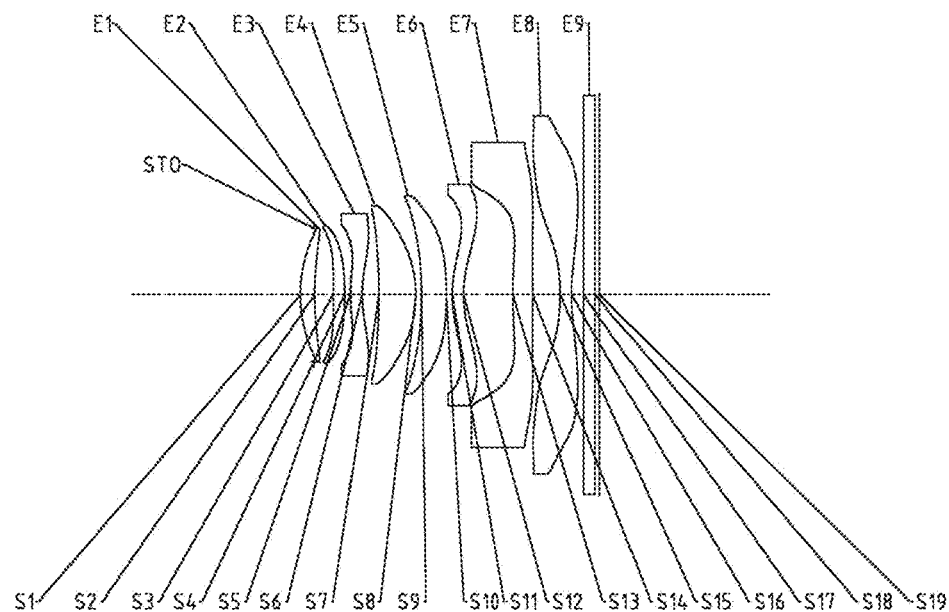
FIG. 7 illustrates a schematic structural view of an optical imaging lens group according to example 4 of the present disclosure.

An optical imaging lens group according to example 4 of the present disclosure is described below with reference to FIG. 7 to FIG. 8D. FIG. 7 shows a schematic structural view of the optical imaging lens group according to example 4 of the present disclosure.

As shown in FIG. 7, the optical imaging lens group according to an exemplary embodiment of the present disclosure includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side along an optical axis.

The first lens E1 has positive refractive power, an object-side surface S1 thereof is a convex surface, and an image-side surface S2 thereof is a concave surface. The second lens E2 has positive refractive power, an object-side surface S3 thereof is a concave surface, and an image-side surface S4 thereof is a convex surface. The third lens E3 has negative refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has positive refractive power, an object-side surface S9 thereof is a concave surface, and an image-side surface S10 thereof is a convex surface. The sixth lens E6 has positive refractive power, an object-side surface S11 thereof is a convex surface, and an image-side surface S12 thereof is a concave surface. The seventh lens E7 has positive refractive power, an object-side surface S13 thereof is a convex surface, and an image-side surface S14 thereof is a convex surface. The eighth lens E8 has negative refractive power, an object-side surface S15 thereof is a concave surface, and an image-side surface S16 thereof is a concave surface. The optical filter E9 has an object-side surface S17 and an image-side surface S18. Light from an object sequentially passes through the respective surfaces S1 to S18 and is finally imaged on the imaging plane S19.

Table 10 shows surface type, radius of curvature, thickness, material and conic coefficient of each lens of the optical imaging lens group in example 4, wherein the units for the radius of curvature and the thickness are millimeter (mm). Table 11 shows high-order coefficients applicable to each aspheric surface in example 4, wherein the surface shape of each aspheric surface may be defined by the formula (1) given in the above example 1. Table 12 shows effective focal lengths f1 to f8 of respective lens, a total effective focal length f of the optical imaging lens group, a distance TTL along the optical axis from the object-side surface S1 of the first lens E1 to the imaging plane S19, and half of a diagonal length ImgH of an effective pixel area on the imaging plane S19 in example 4.

TABLE 10

| Surface number | Surface type | Radius of curvature | Thickness | Material Refractive index | Abbe number | Conic coefficient |
| --- | --- | --- | --- | --- | --- | --- |
| OBJ | Spherical | Infinite | Infinite | | | |
| STO | Spherical | Infinite | −0.2366 | | | |
| S1 | Aspheric | 2.4634 | 0.2535 | 1.59 | 68.3 | 0.4544 |
| S2 | Aspheric | 5.3048 | 0.3307 | | | 8.7070 |
| S3 | Aspheric | −100.0000 | 0.2000 | 1.49 | 70.3 | −99.0000 |
| S4 | Aspheric | −5.9994 | 0.1000 | | | −13.2228 |
| S5 | Aspheric | 3.7472 | 0.2000 | 1.76 | 27.6 | 2.6871 |
| S6 | Aspheric | 2.2140 | 0.2974 | | | −0.1248 |
| S7 | Aspheric | −8.8256 | 0.6529 | 1.62 | 60.3 | −16.9582 |
| S8 | Aspheric | −2.0337 | 0.1000 | | | 0.0903 |
| S9 | Aspheric | −6.9243 | 0.4400 | 1.69 | 50.5 | −5.8759 |
| S10 | Aspheric | −6.8724 | 0.1055 | | | −12.0671 |
| S11 | Aspheric | 2.1386 | 0.2000 | 1.70 | 30.3 | 0.2257 |
| S12 | Aspheric | 2.0770 | 0.8743 | | | 0.0077 |
| S13 | Aspheric | 9.0033 | 0.3513 | 1.55 | 56.1 | 4.3905 |
| S14 | Aspheric | −24.0706 | 0.4849 | | | −76.7767 |
| S15 | Aspheric | −4.0312 | 0.2000 | 1.65 | 44.7 | 0.1587 |
| S16 | Aspheric | 3.7396 | 0.2132 | | | −14.0489 |
| S17 | Spherical | Infinite | 0.2000 | 1.52 | 64.2 | |
| S18 | Spherical | Infinite | 0.0811 | | | |
| S19 | Spherical | Infinite | | | | |

TABLE 11

| Surface number | A4 | A6 | A8 | A10 | A12 |
| --- | --- | --- | --- | --- | --- |
| S1 | −7.9000E−03 | 1.5202E−02 | −1.1805E−01 | 3.9140E−01 | −7.1100E−01 |
| S2 | −1.8430E−02 | −8.7320E−02 | 4.2489E−01 | −1.2675E+00 | 2.3925E+00 |
| S3 | −6.4250E−02 | −5.4760E−02 | 6.9670E−02 | −1.9192E−01 | 6.0624E−01 |

TABLE 11-continued

| | | | | | |
|---|---|---|---|---|---|
| S4 | −5.1120E−02 | −1.6536E−01 | 3.6761E−01 | −4.2990E−01 | 2.5948E−01 |
| S5 | −1.6191E−01 | −1.1711E−01 | 2.6675E−01 | −1.4030E−01 | −2.9181E−01 |
| S6 | −1.3682E−01 | −7.7110E−02 | 2.7348E−01 | −3.8332E−01 | 3.1582E−01 |
| S7 | 9.3840E−03 | −4.0500E−03 | −8.1800E−03 | 4.6246E−02 | −6.5270E−02 |
| S8 | −7.3800E−03 | 4.5550E−02 | −7.6270E−02 | 9.1042E−02 | −6.1240E−02 |
| S9 | −2.4820E−02 | 3.4675E−02 | −7.0160E−02 | 9.6552E−02 | −8.2080E−02 |
| S10 | −8.2760E−02 | 5.7509E−02 | −7.2250E−02 | 7.1664E−02 | −4.9270E−02 |
| S11 | −1.1168E−01 | 2.3105E−02 | −4.6450E−02 | 6.1014E−02 | −4.9070E−02 |
| S12 | −6.1260E−02 | −4.6040E−02 | 5.0600E−02 | −3.4040E−02 | 1.6290E−02 |
| S13 | −1.7180E−02 | 3.1800E−05 | −3.4240E−02 | 4.3922E−02 | −3.3990E−02 |
| S14 | 3.0918E−02 | −1.5900E−02 | 1.4640E−03 | 1.9160E−03 | −1.0200E−03 |
| S15 | −6.5600E−02 | 2.5729E−02 | 8.6020E−03 | −7.0200E−03 | 1.8950E−03 |
| S16 | −3.2240E−02 | −1.9300E−03 | 9.0600E−03 | −4.5000E−03 | 1.1250E−03 |

| Surface number | A14 | A16 | A18 | A20 |
|---|---|---|---|---|
| S1 | 7.6558E−01 | −4.8959E−01 | 1.7287E−01 | −2.6520E−02 |
| S2 | −2.8429E+00 | 2.0536E+00 | −8.2232E−01 | 1.3949E−01 |
| S3 | −1.0446E+00 | 9.6521E−01 | −4.6221E−01 | 9.0715E−02 |
| S4 | −4.8680E−02 | −2.6620E−02 | 1.1462E−02 | −4.5000E−05 |
| S5 | 5.7996E−01 | −4.4658E−01 | 1.6689E−01 | −2.5090E−02 |
| S6 | −1.6299E−01 | 5.3108E−02 | −1.0150E−02 | 8.7500E−04 |
| S7 | 3.3673E−02 | −3.5100E−03 | −2.1500E−03 | 4.9700E−04 |
| S8 | 2.1566E−02 | −3.2700E−03 | 5.9600E−05 | 5.1400E−06 |
| S9 | 4.3187E−02 | −1.3780E−02 | 2.4640E−03 | −1.9000E−04 |
| S10 | 2.2681E−02 | −6.7300E−03 | 1.1760E−03 | −9.2000E−05 |
| S11 | 2.4695E−02 | −7.7600E−03 | 1.3950E−03 | −1.1000E−04 |
| S12 | −5.6100E−03 | 1.2580E−03 | −1.6000E−04 | 8.4300E−06 |
| S13 | 1.5858E−02 | −4.3300E−03 | 6.2900E−04 | −3.7000E−05 |
| S14 | 2.4000E−04 | −3.0000E−05 | 2.0000E−06 | −5.4000E−08 |
| S15 | −2.8000E−04 | 2.3300E−05 | −1.1000E−06 | 2.1000E−08 |
| S16 | −1.6000E−04 | 1.4300E−05 | −6.7000E−07 | 1.3100E−08 |

TABLE 12

| | | | |
|---|---|---|---|
| f1 (mm) | 7.49 | f7 (mm) | 12.05 |
| f2 (mm) | 13.12 | f8 (mm) | −2.94 |
| f3 (mm) | −7.54 | f (mm) | 3.67 |
| f4 (mm) | 4.10 | TTL (mm) | 5.28 |
| f5 (mm) | 300.02 | ImgH (mm) | 3.56 |
| f6 (mm) | 300.00 | | |

Figure 8A:
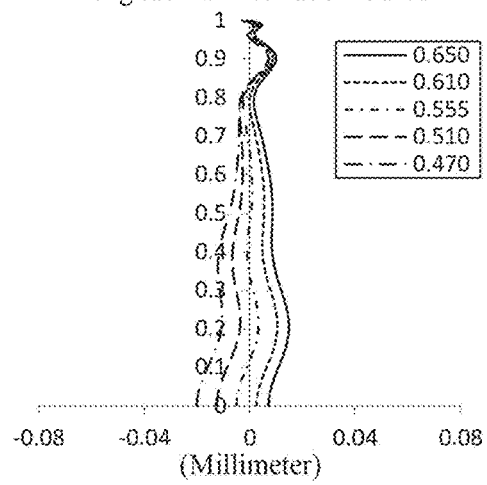
FIGS. 8A to 8D illustrate a longitudinal aberration curve, an astigmatic curve, a distortion curve, and a lateral color curve of the optical imaging lens group of the example 4, respectively.
Figure 8B:
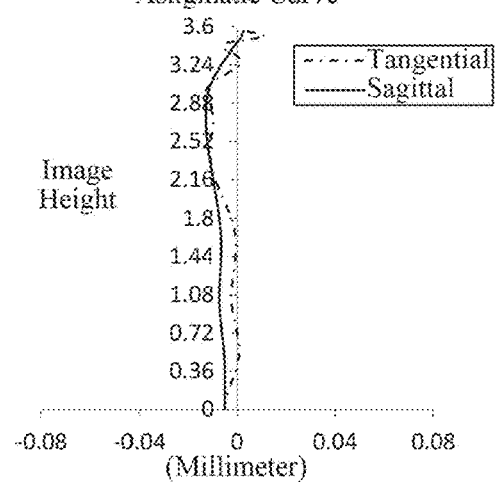
Figure 8C:
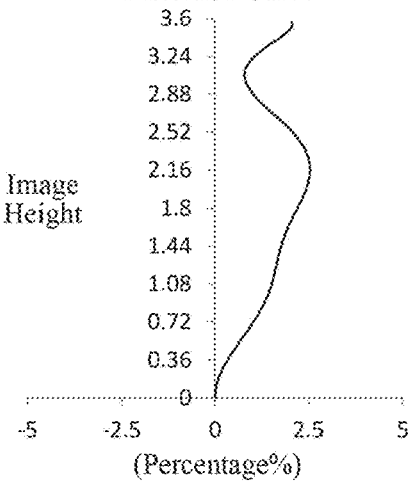
Figure 8D:
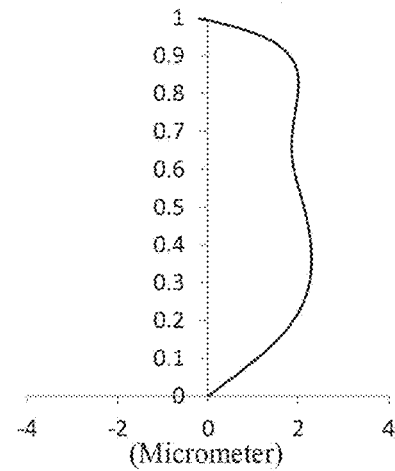

FIG. 8A illustrates a longitudinal aberration curve of the optical imaging lens group according to example 4, representing deviations of focal points converged by light of different wavelengths after passing through the lens group. FIG. 8B illustrates an astigmatic curve of the optical imaging lens group according to example 4, representing a curvature of a tangential plane and a curvature of a sagittal plane. FIG. 8C illustrates a distortion curve of the optical imaging lens group according to example 4, representing amounts of distortion corresponding to different image heights. FIG. 8D illustrates a lateral color curve of the optical imaging lens group according to example 4, representing deviations of different image heights on an imaging plane after light passes through the lens group. It can be seen from FIG. 8A to FIG. 8D that the optical imaging lens group provided in example 4 may achieve good image quality.

Example 5

An optical imaging lens group according to example 5 of the present disclosure is described below with reference to FIG. 9 to FIG. 10D. FIG. 9 shows a schematic structural view of the optical imaging lens group according to example 5 of the present disclosure.

As shown in FIG. 9, the optical imaging lens group according to an exemplary embodiment of the present disclosure includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has negative refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a concave surface, and an image-side surface S10 thereof is a convex surface. The sixth lens E6 has positive refractive power, an object-side surface S11 thereof is a convex surface, and an image-side surface S12 thereof is a concave surface. The seventh lens E7 has positive refractive power, an object-side surface S13 thereof is a convex surface, and an image-side surface S14 thereof is a convex surface. The eighth lens E8 has negative refractive power, an object-side surface S15 thereof is a concave surface, and an image-side surface S16 thereof is a concave surface. The optical filter E9 has an object-side surface S17 and an image-side surface S18. Light from an object sequentially passes through the respective surfaces S1 to S18 and is finally imaged on the imaging plane S19.

Table 13 shows surface type, radius of curvature, thickness, material and conic coefficient of each lens of the optical imaging lens group in example 5, wherein the units for the radius of curvature and the thickness are millimeter (mm). Table 14 shows high-order coefficients applicable to each aspheric surface in example 5, wherein the surface shape of each aspheric surface may be defined by the formula (1) given in the above example 1. Table 15 shows effective focal lengths f1 to f8 of respective lens, a total effective focal length f of the optical imaging lens group, a distance TTL along the optical axis from the object-side surface S1 of the first lens E1 to the imaging plane S19, and half of a diagonal length ImgH of an effective pixel area on the imaging plane S19 in example 5.

TABLE 13

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| STO | Spherical | Infinite | −0.2677 | | | |
| S1 | Aspheric | 2.3902 | 0.4721 | 1.59 | 68.3 | 0.6520 |
| S2 | Aspheric | 5.5195 | 0.1910 | | | 8.1933 |
| S3 | Aspheric | 318.5632 | 0.2000 | 1.49 | 70.3 | −80.0000 |
| S4 | Aspheric | 100.0000 | 0.1132 | | | 99.0000 |
| S5 | Aspheric | 3.2866 | 0.2123 | 1.76 | 27.6 | 0.1315 |
| S6 | Aspheric | 2.4800 | 0.2591 | | | −0.2883 |
| S7 | Aspheric | −18.3338 | 0.7587 | 1.62 | 60.3 | −3.8037 |
| S8 | Aspheric | −1.8350 | 0.1000 | | | 0.0422 |
| S9 | Aspheric | −4.9485 | 0.2217 | 1.69 | 50.5 | −4.4117 |
| S10 | Aspheric | −11.1093 | 0.1000 | | | −29.7669 |
| S11 | Aspheric | 2.1433 | 0.2000 | 1.70 | 30.3 | 0.2537 |
| S12 | Aspheric | 2.0819 | 0.7856 | | | 0.0248 |
| S13 | Aspheric | 5.2240 | 0.3788 | 1.55 | 56.1 | −0.3130 |
| S14 | Aspheric | −100.0000 | 0.5195 | | | −74.4460 |
| S15 | Aspheric | −3.7313 | 0.2000 | 1.65 | 44.7 | −0.0042 |
| S16 | Aspheric | 3.3826 | 0.2050 | | | −14.3123 |
| S17 | Spherical | Infinite | 0.2000 | 1.52 | 64.2 | |
| S18 | Spherical | Infinite | 0.0811 | | | |
| S19 | Spherical | Infinite | | | | |

TABLE 14

| Surface number | A4 | A6 | A8 | A10 | A12 |
|---|---|---|---|---|---|
| S1 | −6.1500E−03 | 1.8700E−02 | −1.1871E−01 | 3.8810E−01 | −7.0319E−01 |
| S2 | −2.1650E−02 | −7.9840E−02 | 3.7454E−01 | −1.0790E+00 | 1.9769E+00 |
| S3 | −3.7060E−02 | −1.0720E−01 | 2.3142E−01 | −3.5295E−01 | 5.4897E−01 |
| S4 | −5.8470E−02 | −1.5489E−01 | 3.8843E−01 | −4.4891E−01 | 2.6099E−01 |
| S5 | −1.6648E−01 | −1.5247E−01 | 2.9577E−01 | −2.9480E−01 | 1.6670E−01 |
| S6 | −1.0968E−01 | −1.1130E−01 | 2.4490E−01 | −2.8117E−01 | 2.2376E−01 |
| S7 | 1.2204E−02 | −1.4760E−02 | 4.1287E−02 | −7.6040E−02 | 8.5026E−02 |
| S8 | 2.9140E−03 | 5.4034E−02 | −9.3930E−02 | 1.1013E−01 | −8.9800E−02 |
| S9 | −4.4570E−02 | 8.8816E−02 | −1.3390E−01 | 1.3033E−01 | −8.7850E−02 |
| S10 | −1.0827E−01 | 9.7561E−02 | −9.6070E−02 | 5.5708E−02 | −1.1060E−02 |
| S11 | −1.3522E−01 | 4.2885E−02 | −5.9500E−02 | 6.8163E−02 | −4.8600E−02 |
| S12 | −8.6480E−02 | −2.0280E−02 | 2.1786E−02 | −2.8400E−03 | −4.2300E−03 |
| S13 | −1.0980E−02 | 1.4281E−02 | −3.2310E−02 | 1.3037E−02 | −7.6000E−04 |
| S14 | 4.0983E−02 | 9.9540E−03 | −2.9710E−02 | 1.6855E−02 | −4.8600E−03 |
| S15 | −7.1940E−02 | 3.1624E−02 | 8.9240E−03 | −7.5100E−03 | 1.9250E−03 |
| S16 | −4.9280E−02 | 1.1126E−02 | 3.2240E−03 | −2.6100E−03 | 6.9900E−04 |

| Surface number | A14 | A16 | A18 | A20 |
|---|---|---|---|---|
| S1 | 7.5897E−01 | −4.8662E−01 | 1.7199E−01 | −2.6010E−02 |
| S2 | −2.2893E+00 | 1.6198E+00 | −6.3924E−01 | 1.0736E−01 |
| S3 | −7.3799E−01 | 6.5740E−01 | −3.2317E−01 | 6.5785E−02 |
| S4 | −2.6140E−02 | −5.4890E−02 | 2.8148E−02 | −4.0500E−03 |
| S5 | −6.1490E−02 | 2.8818E−02 | −1.4900E−02 | 2.7030E−03 |
| S6 | −1.3938E−01 | 6.6996E−02 | −2.0390E−02 | 2.7380E−03 |
| S7 | −7.5010E−02 | 4.3623E−02 | −1.3390E−02 | 1.6180E−03 |
| S8 | 5.1377E−02 | −2.0250E−02 | 4.9960E−03 | −5.7000E−04 |
| S9 | 4.1110E−02 | −1.2210E−02 | 1.9850E−03 | −1.3000E−04 |
| S10 | −6.9100E−03 | 5.5910E−03 | −1.5800E−03 | 1.6600E−04 |
| S11 | 2.1487E−02 | −6.0600E−03 | 1.0270E−03 | −7.9000E−05 |
| S12 | 2.1470E−03 | −4.0000E−04 | 2.8500E−05 | −3.3000E−07 |
| S13 | −1.7400E−03 | 8.5900E−04 | −1.8000E−04 | 1.4800E−05 |
| S14 | 8.0200E−04 | −7.6000E−05 | 3.8600E−06 | −8.0000E−08 |
| S15 | −2.6000E−04 | 2.0100E−05 | −8.4000E−07 | 1.4900E−08 |
| S16 | −1.0000E−04 | 8.7200E−06 | −4.0000E−07 | 7.8800E−09 |

TABLE 15

| f1 (mm) | 6.72 | f7 (mm) | 9.11 |
|---|---|---|---|
| f2 (mm) | −300.00 | f8 (mm) | −2.69 |
| f3 (mm) | −15.00 | f (mm) | 3.63 |
| f4 (mm) | 3.22 | TTL (mm) | 5.20 |
| f5 (mm) | −13.19 | ImgH (mm) | 3.56 |
| f6 (mm) | 300.00 | | |

FIG. 10A illustrates a longitudinal aberration curve of the optical imaging lens group according to example 5, representing deviations of focal points converged by light of different wavelengths after passing through the lens group. FIG. 10B illustrates an astigmatic curve of the optical imaging lens group according to example 5, representing a curvature of a tangential plane and a curvature of a sagittal plane. FIG. 10C illustrates a distortion curve of the optical imaging lens group according to example 5, representing amounts of distortion corresponding to different image heights. FIG. 10D illustrates a lateral color curve of the optical imaging lens group according to example 5, representing deviations of different image heights on an imaging plane after light passes through the lens group. It can be seen from FIG. 10A to FIG. 10D that the optical imaging lens group provided in example 5 may achieve good image quality.

Example 6

Figure 11:
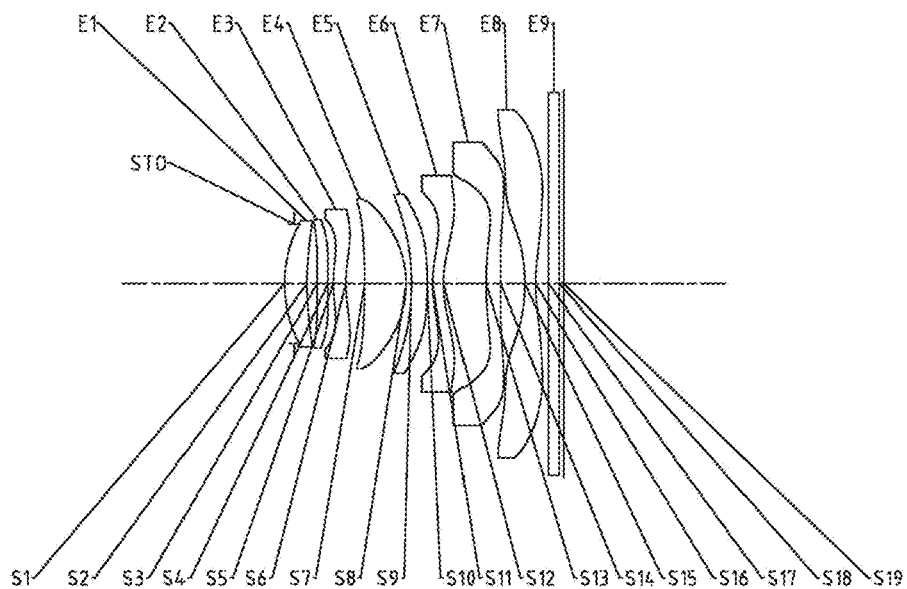
FIG. 11 illustrates a schematic structural view of an optical imaging lens group according to example 6 of the present disclosure.

An optical imaging lens group according to example 6 of the present disclosure is described below with reference to FIG. 11 to FIG. 12D. FIG. 11 shows a schematic structural view of the optical imaging lens group according to example 6 of the present disclosure.

As shown in FIG. 11, the optical imaging lens group according to an exemplary embodiment of the present disclosure includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a concave surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a concave surface, and an image-side surface S10 thereof is a convex surface. The sixth lens E6 has positive refractive power, an object-side surface S11 thereof is a convex surface, and an image-side surface S12 thereof is a concave surface. The seventh lens E7 has positive refractive power, an object-side surface S13 thereof is a convex surface, and an image-side surface S14 thereof is a convex surface. The eighth lens E8 has negative refractive power, an object-side surface S15 thereof is a concave surface, and an image-side surface S16 thereof is a concave surface. The optical filter E9 has an object-side surface S17 and an image-side surface S18. Light from an object sequentially passes through the respective surfaces S1 to S18 and is finally imaged on the imaging plane S19.

Table 16 shows surface type, radius of curvature, thickness, material and conic coefficient of each lens of the optical imaging lens group in example 6, wherein the units for the radius of curvature and the thickness are millimeter (mm). Table 17 shows high-order coefficients applicable to each aspheric surface in example 6, wherein the surface shape of each aspheric surface may be defined by the formula (1) given in the above example 1. Table 18 shows effective focal lengths f1 to f8 of respective lens, a total effective focal length f of the optical imaging lens group, a distance TTL along the optical axis from the object-side surface S1 of the first lens E1 to the imaging plane S19, and half of a diagonal length ImgH of an effective pixel area on the imaging plane S19 in example 6.

TABLE 16

| Surface number | Surface type | Radius of curvature | Thickness | Material Refractive index | Material Abbe number | Conic coefficient |
|---|---|---|---|---|---|---|
| OBJ | Spherical | Infinite | Infinite | | | |
| STO | Spherical | Infinite | −0.1799 | | | |
| S1 | Aspheric | 2.3797 | 0.4116 | 1.59 | 68.3 | 0.5867 |
| S2 | Aspheric | 5.1336 | 0.1911 | | | 8.8993 |
| S3 | Aspheric | −100.0000 | 0.2000 | 1.49 | 70.3 | −80.0000 |
| S4 | Aspheric | 28.0909 | 0.1000 | | | −99.0000 |
| S5 | Aspheric | 2.7551 | 0.2297 | 1.76 | 27.6 | −0.4890 |
| S6 | Aspheric | 2.6884 | 0.3493 | | | −0.1854 |
| S7 | Aspheric | −10.8927 | 0.7656 | 1.62 | 60.3 | −5.7500 |
| S8 | Aspheric | −1.8201 | 0.1000 | | | 0.0567 |
| S9 | Aspheric | −4.7120 | 0.2900 | 1.69 | 50.5 | −4.2221 |
| S10 | Aspheric | −10.8091 | 0.1000 | | | −30.9312 |
| S11 | Aspheric | 2.1645 | 0.2000 | 1.70 | 30.3 | 0.1882 |
| S12 | Aspheric | 2.1035 | 0.7796 | | | 0.0192 |
| S13 | Aspheric | 6.4819 | 0.2691 | 1.55 | 56.1 | 1.0758 |
| S14 | Aspheric | −35.0108 | 0.4450 | | | 80.0000 |
| S15 | Aspheric | −3.8191 | 0.2000 | 1.65 | 44.7 | 0.1207 |
| S16 | Aspheric | 3.1256 | 0.2384 | | | −12.1426 |
| S17 | Spherical | Infinite | 0.2000 | 1.52 | 64.2 | |
| S18 | Spherical | Infinite | 0.0811 | | | |
| S19 | Spherical | Infinite | | | | |

TABLE 17

| Surface number | A4 | A6 | A8 | A10 | A12 |
|---|---|---|---|---|---|
| S1 | −5.8900E−03 | 1.5593E−02 | −1.1932E−01 | 3.8894E−01 | −7.0272E−01 |
| S2 | −1.7920E−02 | −4.4010E−02 | 1.0861E−01 | −1.8863E−01 | 1.6997E−01 |
| S3 | 2.9960E−03 | −9.7370E−02 | −3.1130E−02 | 6.4337E−01 | −1.6586E+00 |
| S4 | −7.2760E−02 | −1.5601E−01 | 3.8769E−01 | −4.4955E−01 | 2.6036E−01 |
| S5 | −1.5754E−01 | −1.4190E−01 | 1.8378E−01 | −1.2492E−01 | 9.5967E−02 |
| S6 | −7.4330E−02 | −1.4207E−01 | 1.8412E−01 | −1.2614E−01 | 7.9934E−02 |
| S7 | 6.0740E−03 | 4.0950E−03 | −2.2300E−03 | −3.3380E−02 | 8.6581E−02 |
| S8 | 2.8550E−03 | 5.6787E−02 | −1.1366E−01 | 1.4187E−01 | −1.1559E−01 |
| S9 | −2.1800E−02 | 5.5970E−03 | 2.7950E−02 | −9.2140E−02 | 1.2362E−01 |
| S10 | −1.1287E−01 | 5.5925E−02 | 3.9091E−02 | −1.5035E−01 | 1.7625E−01 |
| S11 | −1.7195E−01 | 6.3747E−02 | −5.7850E−02 | 4.4086E−02 | −2.3530E−02 |
| S12 | −8.9070E−02 | −2.1670E−02 | 2.3051E−02 | −2.2900E−03 | −6.1300E−03 |
| S13 | −1.6310E−02 | 3.6785E−02 | −6.0660E−02 | 4.4880E−02 | −2.4060E−02 |
| S14 | 3.6467E−02 | 1.1530E−03 | −1.1360E−02 | 3.3290E−03 | 5.1900E−04 |
| S15 | −7.3210E−02 | 3.4501E−02 | 8.1490E−03 | −7.5400E−03 | 1.9650E−03 |
| S16 | −6.5190E−02 | 2.7256E−02 | −3.2300E−03 | −1.3900E−03 | 6.0200E−04 |

| Surface number | A14 | A16 | A18 | A20 |
|---|---|---|---|---|
| S1 | 7.5850E−01 | −4.8662E−01 | 1.7199E−01 | −2.6010E−02 |
| S2 | 7.2760E−03 | −1.5471E−01 | 1.2376E−01 | −3.2390E−02 |
| S3 | 2.2574E+00 | −1.7636E+00 | 7.4652E−01 | −1.3308E−01 |
| S4 | −2.6610E−02 | −5.4890E−02 | 2.8148E−02 | −4.0500E−03 |
| S5 | −1.4771E−01 | 1.4122E−01 | −5.9710E−02 | 8.4490E−03 |
| S6 | −8.4430E−02 | 7.0405E−02 | −2.8720E−02 | 4.3930E−03 |
| S7 | −1.0489E−01 | 6.4368E−02 | −1.9240E−02 | 2.2290E−03 |
| S8 | 6.5278E−02 | −2.5600E−02 | 6.2370E−03 | −6.9000E−04 |
| S9 | −8.9090E−02 | 3.6633E−02 | −8.1100E−03 | 7.4700E−04 |
| S10 | −1.1202E−01 | 4.1235E−02 | −8.2700E−03 | 6.9800E−04 |
| S11 | 8.4900E−03 | −2.3800E−03 | 4.9900E−04 | −5.0000E−05 |
| S12 | 3.7090E−03 | −1.0000E−03 | 1.3800E−04 | −8.1000E−06 |
| S13 | 8.5180E−03 | −1.7400E−03 | 1.7400E−04 | −5.6000E−06 |
| S14 | −4.5000E−04 | 9.2500E−05 | −8.3000E−06 | 2.8300E−07 |
| S15 | −2.7000E−04 | 2.0800E−05 | −8.7000E−07 | 1.5600E−08 |
| S16 | −1.0000E−04 | 9.3300E−06 | −4.4000E−07 | 8.4500E−09 |

TABLE 18

| | | | |
|---|---|---|---|
| f1 (mm) | 7.07 | f7 (mm) | 10.04 |
| f2 (mm) | −45.10 | f8 (mm) | −2.60 |
| f3 (mm) | 300.06 | f (mm) | 3.66 |
| f4 (mm) | 3.40 | TTL (mm) | 5.15 |
| f5 (mm) | −12.40 | ImgH (mm) | 3.56 |
| f6 (mm) | 300.00 | | |

Figure 12A:
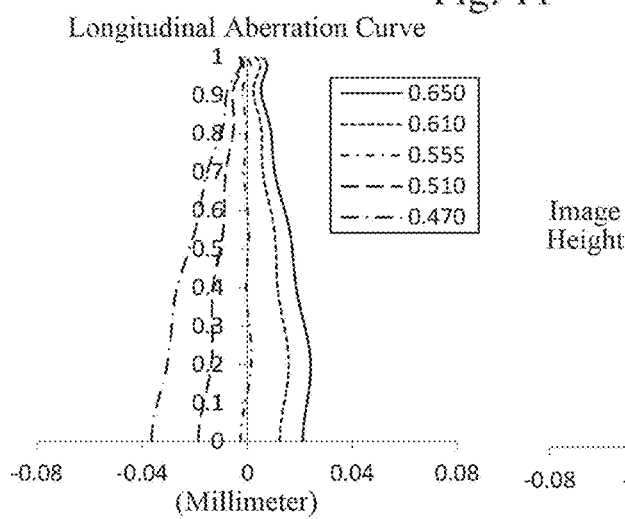
FIGS. 12A to 12D illustrate a longitudinal aberration curve, an astigmatic curve, a distortion curve, and a lateral color curve of the optical imaging lens group of the example 6, respectively.
Figure 12B:
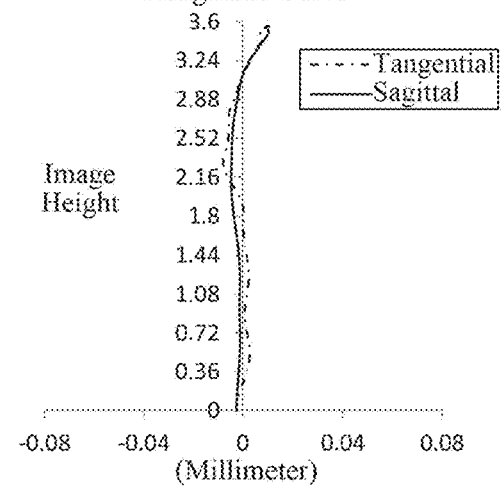
Figure 12C:
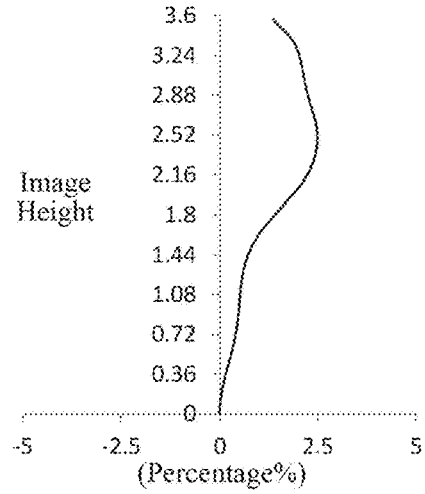
Figure 12D:
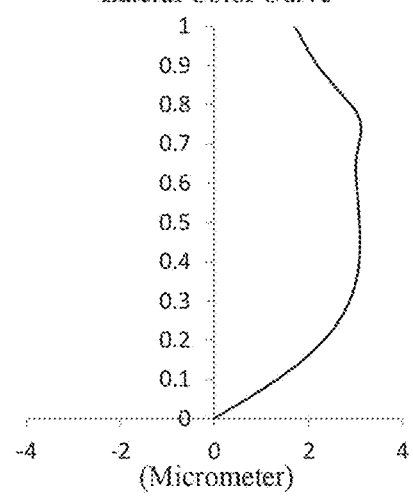

FIG. 12A illustrates a longitudinal aberration curve of the optical imaging lens group according to example 6, representing deviations of focal points converged by light of different wavelengths after passing through the lens group. FIG. 12B illustrates an astigmatic curve of the optical imaging lens group according to example 6, representing a curvature of a tangential plane and a curvature of a sagittal plane. FIG. 12C illustrates a distortion curve of the optical imaging lens group according to example 6, representing amounts of distortion corresponding to different image heights. FIG. 12D illustrates a lateral color curve of the optical imaging lens group according to example 6, representing deviations of different image heights on an imaging plane after light passes through the lens group. It can be seen from FIG. 12A to FIG. 12D that the optical imaging lens group provided in example 6 may achieve good image quality.

Example 7

An optical imaging lens group according to example 7 of the present disclosure is described below with reference to FIG. 13 to FIG. 14D. FIG. 13 shows a schematic structural view of the optical imaging lens group according to example 7 of the present disclosure.

As shown in FIG. 13, the optical imaging lens group according to an exemplary embodiment of the present disclosure includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a concave surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a concave surface, and an image-side surface S10 thereof is a convex surface. The sixth lens E6 has negative refractive power, an object-side surface S11 thereof is a convex surface, and an image-side surface S12 thereof is a concave surface. The seventh lens E7 has positive refractive power, an object-side surface S13 thereof is a convex surface, and an image-side surface S14 thereof is a concave surface. The eighth lens E8 has negative refractive power, an object-side surface S15 thereof is a concave surface, and an image-side surface S16 thereof is a concave surface. The optical filter E9 has an object-side surface S17 and an image-side surface S18. Light from an object sequentially passes through the respective surfaces S1 to S18 and is finally imaged on the imaging plane S19.

Table 19 shows surface type, radius of curvature, thickness, material and conic coefficient of each lens of the optical imaging lens group in example 7, wherein the units for the radius of curvature and the thickness are millimeter (mm). Table 20 shows high-order coefficients applicable to each aspheric surface in example 7, wherein the surface shape of each aspheric surface may be defined by the formula (1) given in the above example 1. Table 21 shows effective focal lengths f1 to f8 of respective lens, a total effective focal length f of the optical imaging lens group, a distance TTL along the optical axis from the object-side surface S1 of the first lens E1 to the imaging plane S19, and half of a diagonal length ImgH of an effective pixel area on the imaging plane S19 in example 7.

TABLE 19

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| STO | Spherical | Infinite | −0.1553 | | | |
| S1 | Aspheric | 2.3860 | 0.4441 | 1.59 | 68.3 | 0.6315 |
| S2 | Aspheric | 5.0939 | 0.1971 | | | 9.8593 |
| S3 | Aspheric | −99.9897 | 0.2000 | 1.49 | 70.3 | −80.0000 |
| S4 | Aspheric | 28.0251 | 0.1000 | | | −99.0000 |
| S5 | Aspheric | 2.8020 | 0.2437 | 1.76 | 27.6 | −0.3856 |
| S6 | Aspheric | 2.7999 | 0.3500 | | | −0.1074 |
| S7 | Aspheric | −10.0864 | 0.7629 | 1.62 | 60.3 | −16.8195 |
| S8 | Aspheric | −1.8165 | 0.1000 | | | 0.0345 |
| S9 | Aspheric | −4.6132 | 0.5210 | 1.69 | 50.5 | −8.4905 |
| S10 | Aspheric | −5.0066 | 0.1000 | | | −37.5111 |
| S11 | Aspheric | 2.8490 | 0.2000 | 1.70 | 30.3 | 0.4709 |
| S12 | Aspheric | 2.1365 | 0.7771 | | | 0.0096 |
| S13 | Aspheric | 9.3967 | 0.2863 | 1.55 | 56.1 | 1.8007 |
| S14 | Aspheric | 100.0000 | 0.3734 | | | 80.0000 |
| S15 | Aspheric | −4.6656 | 0.2000 | 1.65 | 44.7 | 0.3746 |
| S16 | Aspheric | 3.6706 | 0.2145 | | | −8.6327 |
| S17 | Spherical | Infinite | 0.2000 | 1.52 | 64.2 | |
| S18 | Spherical | Infinite | 0.0811 | | | |
| S19 | Spherical | Infinite | | | | |

TABLE 20

| Surface number | A4 | A6 | A8 | A10 | A12 |
|---|---|---|---|---|---|
| S1 | −5.1700E−03 | 1.6806E−02 | −1.2014E−01 | 3.8902E−01 | −7.0248E−01 |
| S2 | −1.6690E−02 | −3.3330E−02 | 7.0732E−02 | −9.5420E−02 | 1.7350E−02 |
| S3 | 7.7210E−03 | −1.0850E−01 | 5.7480E−02 | 3.3009E−01 | −1.0493E+00 |
| S4 | −7.7940E−02 | −1.5561E−01 | 3.8736E−01 | −4.4967E−01 | 2.6045E−01 |
| S5 | −1.5063E−01 | −1.6668E−01 | 2.7104E−01 | −3.5313E−01 | 4.9043E−01 |
| S6 | −6.1930E−02 | −1.5597E−01 | 2.0036E−01 | −1.4328E−01 | 9.4304E−02 |
| S7 | 1.1337E−02 | −1.2100E−02 | 3.0482E−02 | −8.2330E−02 | 1.4007E−01 |
| S8 | 4.2120E−03 | 4.1547E−02 | −7.5330E−02 | 8.4345E−02 | −5.5160E−02 |
| S9 | −3.5420E−02 | 3.7337E−02 | −3.4580E−02 | 5.8670E−03 | 2.9425E−02 |
| S10 | −1.2290E−01 | 1.0377E−01 | −6.5240E−02 | −2.0800E−03 | 4.2466E−02 |
| S11 | −1.5856E−01 | 6.0693E−02 | −6.6630E−02 | 6.2605E−02 | −3.9650E−02 |
| S12 | −9.7360E−02 | −1.6750E−02 | 2.2066E−02 | −2.4000E−03 | −6.6800E−03 |
| S13 | −4.2200E−02 | 9.2334E−02 | −1.2655E−01 | 1.0109E−01 | −5.7180E−02 |
| S14 | −2.3500E−02 | 6.8214E−02 | −5.7730E−02 | 2.4020E−02 | −5.4500E−03 |
| S15 | −7.7350E−02 | 3.4473E−02 | 8.1560E−03 | −7.5400E−03 | 1.9650E−03 |
| S16 | −5.0630E−02 | 9.4840E−03 | 4.8930E−03 | −3.3800E−03 | 8.9400E−04 |

| Surface number | A14 | A16 | A18 | A20 |
|---|---|---|---|---|
| S1 | 7.5836E−01 | −4.8662E−01 | 1.7199E−01 | −2.6010E−02 |
| S2 | 1.6496E−01 | −2.4884E−01 | 1.5099E−01 | −3.4490E−02 |
| S3 | 1.5426E+00 | −1.2545E+00 | 5.4228E−01 | −9.7190E−02 |
| S4 | −2.6470E−02 | −5.4890E−02 | 2.8148E−02 | −4.0500E−03 |
| S5 | −5.8479E−01 | 4.3739E−01 | −1.7079E−01 | 2.6097E−02 |
| S6 | −9.4480E−02 | 7.5043E−02 | −2.9760E−02 | 4.4660E−03 |
| S7 | −1.4252E−01 | 7.9861E−02 | −2.2610E−02 | 2.5240E−03 |
| S8 | 2.4583E−02 | −9.0600E−03 | 2.5190E−03 | −3.3000E−04 |
| S9 | −3.2780E−02 | 1.5785E−02 | −3.7300E−03 | 3.5100E−04 |
| S10 | −3.5450E−02 | 1.4226E−02 | −2.9200E−03 | 2.4600E−04 |

TABLE 20-continued

| | | | | |
|---|---|---|---|---|
| S11 | 1.6186E−02 | −4.4500E−03 | 7.9400E−04 | −6.7000E−05 |
| S12 | 4.3550E−03 | −1.2600E−03 | 1.8500E−04 | −1.1000E−05 |
| S13 | 2.1484E−02 | −4.9200E−03 | 6.1100E−04 | −3.1000E−05 |
| S14 | 6.5400E−04 | −3.4000E−05 | −1.9000E−07 | 5.8100E−08 |
| S15 | −2.7000E−04 | 2.0800E−05 | −8.7000E−07 | 1.5600E−08 |
| S16 | −1.3000E−04 | 1.0800E−05 | −4.8000E−07 | 9.0200E−09 |

TABLE 21

| | | | |
|---|---|---|---|
| f1 (mm) | 7.12 | f7 (mm) | 18.98 |
| f2 (mm) | −45.02 | f8 (mm) | −3.12 |
| f3 (mm) | 99.98 | f (mm) | 3.77 |
| f4 (mm) | 3.44 | TTL (mm) | 5.35 |
| f5 (mm) | −185.49 | ImgH (mm) | 3.56 |
| f6 (mm) | −13.74 | | |

FIG. 14A illustrates a longitudinal aberration curve of the optical imaging lens group according to example 7, representing deviations of focal points converged by light of different wavelengths after passing through the lens group. FIG. 14B illustrates an astigmatic curve of the optical imaging lens group according to example 7, representing a curvature of a tangential plane and a curvature of a sagittal plane. FIG. 14C illustrates a distortion curve of the optical imaging lens group according to example 7, representing amounts of distortion corresponding to different image heights. FIG. 14D illustrates a lateral color curve of the optical imaging lens group according to example 7, representing deviations of different image heights on an imaging plane after light passes through the lens group. It can be seen from FIG. 14A to FIG. 14D that the optical imaging lens group provided in example 7 may achieve good image quality.

Example 8

Figure 15:
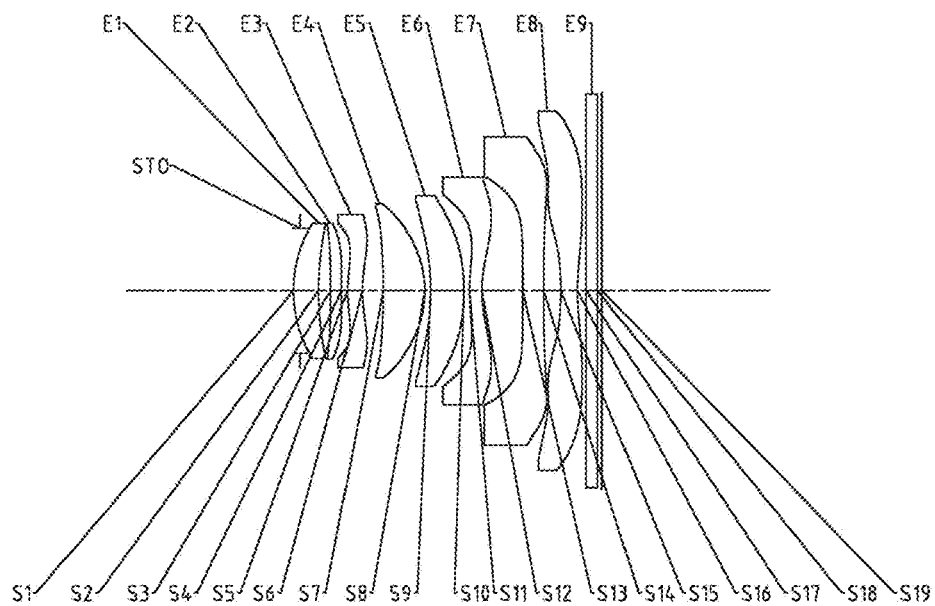
FIG. 15 illustrates a schematic structural view of an optical imaging lens group according to example 8 of the present disclosure.

An optical imaging lens group according to example 8 of the present disclosure is described below with reference to FIG. 15 to FIG. 16D. FIG. 15 shows a schematic structural view of the optical imaging lens group according to example 8 of the present disclosure.

As shown in FIG. 15, the optical imaging lens group according to an exemplary embodiment of the present disclosure includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a concave surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has positive refractive power, an object-side surface S9 thereof is a concave surface, and an image-side surface S10 thereof is a convex surface. The sixth lens E6 has negative refractive power, an object-side surface S11 thereof is a convex surface, and an image-side surface S12 thereof is a concave surface. The seventh lens E7 has negative refractive power, an object-side surface S13 thereof is a concave surface, and an image-side surface S14 thereof is a concave surface. The eighth lens E8 has negative refractive power, an object-side surface S15 thereof is a concave surface, and an image-side surface S16 thereof is a concave surface. The optical filter E9 has an object-side surface S17 and an image-side surface S18. Light from an object sequentially passes through the respective surfaces S1 to S18 and is finally imaged on the imaging plane S19.

Table 22 shows surface type, radius of curvature, thickness, material and conic coefficient of each lens of the optical imaging lens group in example 8, wherein the units for the radius of curvature and the thickness are millimeter (mm). Table 23 shows high-order coefficients applicable to each aspheric surface in example 8, wherein the surface shape of each aspheric surface may be defined by the formula (1) given in the above example 1. Table 24 shows effective focal lengths f1 to f8 of respective lens, a total effective focal length f of the optical imaging lens group, a distance TTL along the optical axis from the object-side surface S1 of the first lens E1 to the imaging plane S19, and half of a diagonal length ImgH of an effective pixel area on the imaging plane S19 in example 8.

TABLE 22

| | | | | Material | | |
|---|---|---|---|---|---|---|
| Surface number | Surface type | Radius of curvature | Thickness | Refractive index | Abbe number | Conic coefficient |
| OBJ | Spherical | Infinite | Infinite | | | |
| STO | Spherical | Infinite | −0.1155 | | | |
| S1 | Aspheric | 2.3758 | 0.4493 | 1.59 | 68.3 | 0.6551 |
| S2 | Aspheric | 5.0899 | 0.2138 | | | 10.1329 |
| S3 | Aspheric | −78.2723 | 0.2000 | 1.49 | 70.3 | 80.0000 |
| S4 | Aspheric | 29.0105 | 0.1000 | | | −61.9558 |
| S5 | Aspheric | 2.7800 | 0.2668 | 1.76 | 27.6 | −0.3524 |
| S6 | Aspheric | 2.7660 | 0.3723 | | | −0.0916 |
| S7 | Aspheric | −10.1246 | 0.7461 | 1.62 | 60.3 | −22.3245 |
| S8 | Aspheric | −1.8173 | 0.1050 | | | 0.0309 |
| S9 | Aspheric | −4.5937 | 0.5972 | 1.69 | 50.5 | −10.4694 |
| S10 | Aspheric | −3.8594 | 0.1025 | | | −31.9893 |

TABLE 22-continued

| Surface number | Surface type | Radius of curvature | Thickness | Material Refractive index | Abbe number | Conic coefficient |
|---|---|---|---|---|---|---|
| S11 | Aspheric | 3.4582 | 0.2204 | 1.70 | 30.3 | 0.6334 |
| S12 | Aspheric | 2.1606 | 0.7365 | | | 0.0056 |
| S13 | Aspheric | −28.7691 | 0.3744 | 1.55 | 56.1 | 73.9945 |
| S14 | Aspheric | 65.0698 | 0.3070 | | | 80.0000 |
| S15 | Aspheric | −7.3478 | 0.3000 | 1.65 | 44.7 | 2.9340 |
| S16 | Aspheric | 4.2660 | 0.1566 | | | −8.3495 |
| S17 | Spherical | Infinite | 0.2000 | 1.52 | 64.2 | |
| S18 | Spherical | Infinite | 0.0811 | | | |
| S19 | Spherical | Infinite | | | | |

TABLE 23

| Surface number | A4 | A6 | A8 | A10 | A12 |
|---|---|---|---|---|---|
| S1 | −4.9500E−03 | 1.7564E−02 | −1.2034E−01 | 3.8910E−01 | −7.0237E−01 |
| S2 | −1.7820E−02 | −2.9570E−02 | 7.2285E−02 | −1.2620E−01 | 1.2557E−01 |
| S3 | 8.7530E−03 | −1.0824E−01 | 9.3599E−02 | 1.3512E−01 | −5.4678E−01 |
| S4 | −7.9690E−02 | −1.5534E−01 | 3.8747E−01 | −4.4954E−01 | 2.6063E−01 |
| S5 | −1.5203E−01 | −1.5977E−01 | 2.7912E−01 | −4.1780E−01 | 6.2152E−01 |
| S6 | −6.1980E−02 | −1.4732E−01 | 1.9383E−01 | −1.5633E−01 | 1.2085E−01 |
| S7 | 1.1398E−02 | −1.5970E−02 | 4.9576E−02 | −1.2036E−01 | 1.8100E−01 |
| S8 | 3.4290E−03 | 4.0920E−02 | −6.8790E−02 | 7.1239E−02 | −4.1050E−02 |
| S9 | −3.4780E−02 | 4.5498E−02 | −6.1070E−02 | 4.7815E−02 | −9.8100E−03 |
| S10 | −1.2577E−01 | 1.1158E−01 | −7.7110E−02 | 1.0670E−02 | 3.3964E−02 |
| S11 | −1.5049E−01 | 3.8022E−02 | −2.7670E−02 | 2.0413E−02 | −9.1600E−03 |
| S12 | −1.0323E−01 | −1.3150E−02 | 2.2723E−02 | −5.0200E−03 | −4.5200E−03 |
| S13 | 1.1542E−02 | 7.4440E−03 | −2.7450E−02 | 1.5330E−02 | −4.9500E−03 |
| S14 | −3.2000E−04 | 2.0133E−02 | −2.4380E−02 | 1.3742E−02 | −4.2600E−03 |
| S15 | −8.2290E−02 | 3.4416E−02 | 8.1660E−03 | −7.5400E−03 | 1.9650E−03 |
| S16 | −5.3880E−02 | 1.5665E−02 | −1.1200E−03 | −5.5000E−04 | 1.7400E−04 |

| Surface number | A14 | A16 | A18 | A20 |
|---|---|---|---|---|
| S1 | 7.5837E−01 | −4.8662E−01 | 1.7199E−01 | −2.6010E−02 |
| S2 | −3.1570E−02 | −5.1200E−02 | 4.7656E−02 | −1.2770E−02 |
| S3 | 8.1023E−01 | −6.3834E−01 | 2.6366E−01 | −4.4980E−02 |
| S4 | −2.6280E−02 | −5.4890E−02 | 2.8148E−02 | −4.0500E−03 |
| S5 | −7.3017E−01 | 5.3282E−01 | −2.0568E−01 | 3.1697E−02 |
| S6 | −1.1265E−01 | 7.9491E−02 | −2.9460E−02 | 4.2650E−03 |
| S7 | −1.6648E−01 | 8.6905E−02 | −2.3400E−02 | 2.5190E−03 |
| S8 | 1.5827E−02 | −5.9700E−03 | 1.9540E−03 | −2.9000E−04 |
| S9 | −1.0260E−02 | 8.0120E−03 | −2.2500E−03 | 2.3100E−04 |
| S10 | −3.2090E−02 | 1.3481E−02 | −2.8500E−03 | 2.4400E−04 |
| S11 | 2.0780E−03 | −5.2000E−04 | 1.9800E−04 | −2.9000E−05 |
| S12 | 3.4040E−03 | −1.0200E−03 | 1.5300E−04 | −9.4000E−06 |
| S13 | 1.2120E−03 | −2.3000E−04 | 2.4800E−05 | −9.9000E−07 |
| S14 | 7.6100E−04 | −7.8000E−05 | 4.3100E−06 | −9.9000E−08 |
| S15 | −2.7000E−04 | 2.0800E−05 | −8.7000E−07 | 1.5600E−08 |
| S16 | −2.4000E−05 | 1.8300E−06 | −7.3000E−08 | 1.1800E−09 |

TABLE 24

| f1 (mm) | 7.07 | f7 (mm) | −36.49 |
|---|---|---|---|
| f2 (mm) | −43.53 | f8 (mm) | −4.09 |
| f3 (mm) | 99.99 | f (mm) | 3.92 |
| f4 (mm) | 3.44 | TTL (mm) | 5.53 |
| f5 (mm) | 26.41 | ImgH (mm) | 3.56 |
| f6 (mm) | −8.80 | | |

Figures 16A, 16B:
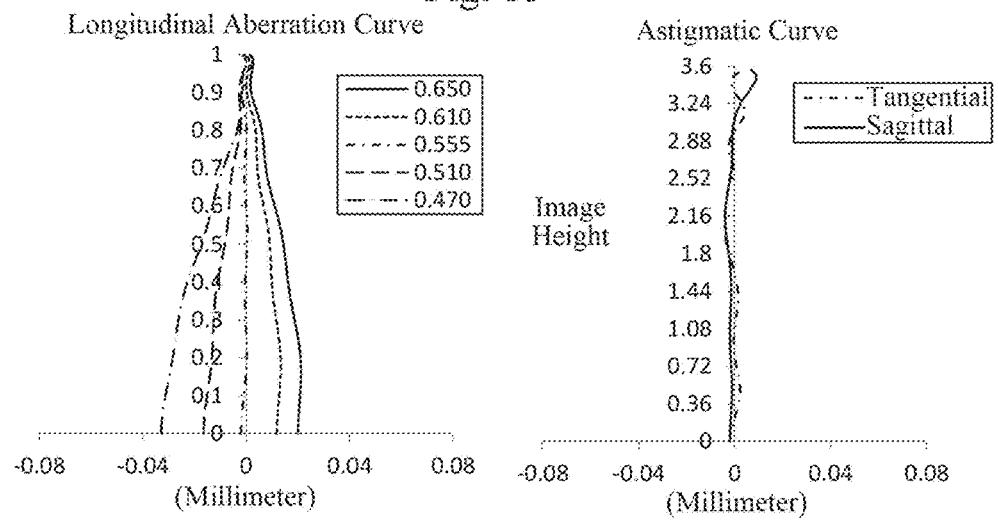
FIGS. 16A to 16D illustrate a longitudinal aberration curve, an astigmatic curve, a distortion curve, and a lateral color curve of the optical imaging lens group of the example 8, respectively.
Figure 16C:
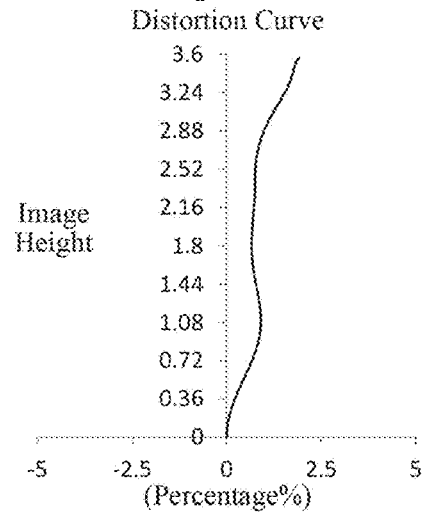
Figure 16D:
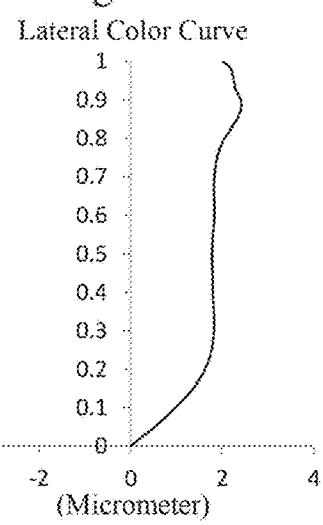

FIG. 16A illustrates a longitudinal aberration curve of the optical imaging lens group according to example 8, representing deviations of focal points converged by light of different wavelengths after passing through the lens group. FIG. 16B illustrates an astigmatic curve of the optical imaging lens group according to example 8, representing a curvature of a tangential plane and a curvature of a sagittal plane. FIG. 16C illustrates a distortion curve of the optical imaging lens group according to example 8, representing amounts of distortion corresponding to different image heights. FIG. 16D illustrates a lateral color curve of the optical imaging lens group according to example 8, representing deviations of different image heights on an imaging plane after light passes through the lens group. It can be seen from FIG. 16A to FIG. 16D that the optical imaging lens group provided in example 8 may achieve good image quality.

Example 9

An optical imaging lens group according to example 9 of the present disclosure is described below with reference to FIG. 17 to FIG. 18D. FIG. 17 shows a schematic structural view of the optical imaging lens group according to example 9 of the present disclosure.

As shown in FIG. 17, the optical imaging lens group according to an exemplary embodiment of the present disclosure includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side along an optical axis.

The first lens E1 has positive refractive power, an object-side surface S1 thereof is a convex surface, and an image-side surface S2 thereof is a concave surface. The second lens E2 has positive refractive power, an object-side surface S3 thereof is a convex surface, and an image-side surface S4 thereof is a convex surface. The third lens E3 has negative refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has positive refractive power, an object-side surface S9 thereof is a concave surface, and an image-side surface S10 thereof is a convex surface. The sixth lens E6 has negative refractive power, an object-side surface S11 thereof is a convex surface, and an image-side surface S12 thereof is a concave surface. The seventh lens E7 has negative refractive power, an object-side surface S13 thereof is a concave surface, and an image-side surface S14 thereof is a concave surface. The eighth lens E8 has negative refractive power, an object-side surface S15 thereof is a concave surface, and an image-side surface S16 thereof is a concave surface. The optical filter E9 has an object-side surface S17 and an image-side surface S18. Light from an object sequentially passes through the respective surfaces S1 to S18 and is finally imaged on the imaging plane S19.

Table 25 shows surface type, radius of curvature, thickness, material and conic coefficient of each lens of the optical imaging lens group in example 9, wherein the units for the radius of curvature and the thickness are millimeter (mm). Table 26 shows high-order coefficients applicable to each aspheric surface in example 9, wherein the surface shape of each aspheric surface may be defined by the formula (1) given in the above example 1. Table 27 shows effective focal lengths f1 to f8 of respective lens, a total effective focal length f of the optical imaging lens group, a distance TTL along the optical axis from the object-side surface S1 of the first lens E1 to the imaging plane S19, and half of a diagonal length ImgH of an effective pixel area on the imaging plane S19 in example 9.

TABLE 25

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| STO | Spherical | Infinite | −0.1632 | | | |
| S1 | Aspheric | 2.4043 | 0.4904 | 1.59 | 68.3 | 0.6282 |
| S2 | Aspheric | 4.8332 | 0.2337 | | | 10.1425 |
| S3 | Aspheric | 30.3861 | 0.2000 | 1.49 | 70.3 | −9.1158 |
| S4 | Aspheric | −102.4920 | 0.1000 | | | −99.0000 |
| S5 | Aspheric | 3.3094 | 0.2558 | 1.76 | 27.6 | 0.2435 |
| S6 | Aspheric | 2.8018 | 0.3418 | | | −0.1365 |
| S7 | Aspheric | −8.3271 | 0.7178 | 1.62 | 60.3 | −27.8269 |
| S8 | Aspheric | −1.8189 | 0.1106 | | | 0.0282 |
| S9 | Aspheric | −4.6256 | 0.4564 | 1.69 | 50.5 | −10.8730 |
| S10 | Aspheric | −3.7712 | 0.1047 | | | −31.4310 |
| S11 | Aspheric | 3.5243 | 0.2620 | 1.70 | 30.3 | 1.0733 |
| S12 | Aspheric | 2.1689 | 0.7710 | | | 0.0136 |
| S13 | Aspheric | −40.4130 | 0.3959 | 1.55 | 56.1 | 80.0000 |
| S14 | Aspheric | 100.0000 | 0.3152 | | | 69.4350 |
| S15 | Aspheric | −6.5139 | 0.4680 | 1.65 | 44.7 | 2.8831 |
| S16 | Aspheric | 4.5985 | 0.1000 | | | −6.2642 |
| S17 | Spherical | Infinite | 0.2000 | 1.52 | 64.2 | |
| S18 | Spherical | Infinite | 0.0811 | | | |
| S19 | Spherical | Infinite | | | | |

TABLE 26

| Surface number | A4 | A6 | A8 | A10 | A12 |
|---|---|---|---|---|---|
| S1 | −5.7700E−03 | 1.8525E−02 | −1.2114E−01 | 3.8872E−01 | −7.0243E−01 |
| S2 | −2.2110E−02 | −1.6900E−02 | 6.3017E−02 | −1.6789E−01 | 2.6751E−01 |
| S3 | −1.2590E−02 | −6.2500E−02 | −1.0750E−02 | 3.4692E−01 | −8.8489E−01 |
| S4 | −7.5890E−02 | −1.5520E−01 | 3.8692E−01 | −4.9977E−01 | 2.6066E−01 |
| S5 | −1.4528E−01 | −2.0551E−01 | 4.2102E−01 | −6.1442E−01 | 7.7477E−01 |
| S6 | −6.5170E−02 | −1.7035E−01 | 2.8199E−01 | −2.7565E−01 | 1.9291E−01 |
| S7 | 1.7562E−02 | −3.1360E−02 | 7.3184E−02 | −1.4572E−01 | 1.9988E−01 |
| S8 | 3.1430E−03 | 4.2048E−02 | −6.8980E−02 | 7.1829E−02 | −4.3910E−02 |

TABLE 26-continued

| | | | | | |
|---|---|---|---|---|---|
| S9 | −4.3670E−02 | 7.3558E−02 | −1.0726E−01 | 1.0404E−01 | −5.8970E−02 |
| S10 | −1.2577E−01 | 1.1972E−01 | −1.0061E−01 | 4.5032E−02 | 5.5220E−03 |
| S11 | −1.3778E−01 | 1.9029E−02 | −6.4100E−03 | 8.7470E−03 | −6.4800E−03 |
| S12 | −1.1255E−01 | −1.0710E−02 | 2.8068E−02 | −1.2960E−02 | 8.5400E−04 |
| S13 | −8.9800E−03 | 2.5376E−02 | −4.7880E−02 | 3.8066E−02 | −2.1530E−02 |
| S14 | −2.5640E−02 | 3.2591E−02 | −2.1080E−02 | 8.5130E−03 | −2.1100E−03 |
| S15 | −8.3630E−02 | 3.4588E−02 | 8.1930E−03 | −7.5400E−03 | 1.9650E−03 |
| S16 | −4.4900E−02 | 1.1305E−02 | −7.5000E−04 | −2.1000E−04 | 3.8500E−05 |

| Surface number | A14 | A16 | A18 | A20 |
|---|---|---|---|---|
| S1 | 7.5839E−01 | −4.8662E−01 | 1.7199E−01 | −2.6010E−02 |
| S2 | −2.2657E−01 | 8.2921E−02 | 4.6360E−03 | −8.4000E−03 |
| S3 | 1.2061E+00 | −9.4637E−01 | 4.0377E−01 | −7.2810E−02 |
| S4 | −2.6140E−02 | −5.4890E−02 | 2.8148E−02 | −4.0500E−03 |
| S5 | −8.0406E−01 | 5.6397E−01 | −2.2218E−01 | 3.6627E−02 |
| S6 | −1.1773E−01 | 6.0998E−02 | −1.9740E−02 | 2.7010E−03 |
| S7 | −1.7755E−01 | 9.2209E−02 | −2.5050E−02 | 2.7370E−03 |
| S8 | 1.9258E−02 | −7.8100E−03 | 2.4440E−03 | −3.5000E−04 |
| S9 | 1.8155E−02 | −2.1300E−03 | −2.4000E−04 | 6.2100E−05 |
| S10 | −1.8400E−02 | 9.7220E−03 | −2.3100E−03 | 2.1400E−04 |
| S11 | 2.3410E−03 | −7.8000E−04 | 2.3800E−04 | −3.0000E−05 |
| S12 | 1.3460E−03 | −5.7000E−04 | 9.9800E−05 | −6.8000E−06 |
| S13 | 8.0470E−03 | −1.7500E−03 | 1.8800E−04 | −6.9000E−06 |
| S14 | 2.9900E−04 | −2.2000E−05 | 6.2200E−07 | 1.9600E−09 |
| S15 | −2.7000E−04 | 2.0800E−05 | −8.7000E−07 | 1.5600E−08 |
| S16 | 3.7500E−07 | −6.1000E−07 | 5.6100E−08 | −1.7000E−09 |

TABLE 27

| | | | |
|---|---|---|---|
| f1 (mm) | 7.49 | f7 (mm) | −52.67 |
| f2 (mm) | 48.25 | f8 (mm) | −4.06 |
| f3 (mm) | −30.72 | f (mm) | 3.98 |
| f4 (mm) | 3.59 | TTL (mm) | 5.60 |
| f5 (mm) | 24.42 | ImgH (mm) | 3.56 |
| f6 (mm) | −8.71 | | |

FIG. 18A illustrates a longitudinal aberration curve of the optical imaging lens group according to example 9, representing deviations of focal points converged by light of different wavelengths after passing through the lens group. FIG. 18B illustrates an astigmatic curve of the optical imaging lens group according to example 9, representing a curvature of a tangential plane and a curvature of a sagittal plane. FIG. 18C illustrates a distortion curve of the optical imaging lens group according to example 9, representing amounts of distortion corresponding to different image heights. FIG. 18D illustrates a lateral color curve of the optical imaging lens group according to example 9, representing deviations of different image heights on an imaging plane after light passes through the lens group. It can be seen from FIG. 18A to FIG. 18D that the optical imaging lens group provided in example 9 may achieve good image quality.

Example 10

An optical imaging lens group according to example 10 of the present disclosure is described below with reference to FIG. 19 to FIG. 20D. FIG. 19 shows a schematic structural view of the optical imaging lens group according to example 10 of the present disclosure.

As shown in FIG. 19, the optical imaging lens group according to an exemplary embodiment of the present disclosure includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a concave surface, and an image-side surface S4 thereof is a convex surface. The third lens E3 has negative refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has positive refractive power, an object-side surface S9 thereof is a concave surface, and an image-side surface S10 thereof is a convex surface. The sixth lens E6 has negative refractive power, an object-side surface S11 thereof is a convex surface, and an image-side surface S12 thereof is a concave surface. The seventh lens E7 has negative refractive power, an object-side surface S13 thereof is a concave surface, and an image-side surface S14 thereof is a concave surface. The eighth lens E8 has negative refractive power, an object-side surface S15 thereof is a concave surface, and an image-side surface S16 thereof is a concave surface. The optical filter E9 has an object-side surface S17 and an image-side surface S18. Light from an object sequentially passes through the respective surfaces S1 to S18 and is finally imaged on the imaging plane S19.

Table 28 shows surface type, radius of curvature, thickness, material and conic coefficient of each lens of the optical imaging lens group in example 10, wherein the units for the radius of curvature and the thickness are millimeter (mm). Table 29 shows high-order coefficients applicable to each aspheric surface in example 10, wherein the surface shape of each aspheric surface may be defined by the formula (1) given in the above example 1. Table 30 shows effective focal lengths f1 to f8 of respective lens, a total effective focal length f of the optical imaging lens group, a distance TTL along the optical axis from the object-side surface S1 of the first lens E1 to the imaging plane S19, and half of a diagonal length ImgH of an effective pixel area on the imaging plane S19 in example 10.

TABLE 28

| Surface number | Surface type | Radius of curvature | Thickness | Material Refractive index | Material Abbe number | Conic coefficient |
|---|---|---|---|---|---|---|
| OBJ | Spherical | Infinite | Infinite | | | |
| STO | Spherical | Infinite | −0.1292 | | | |
| S1 | Aspheric | 2.5160 | 0.4944 | 1.59 | 68.3 | 0.6214 |
| S2 | Aspheric | 5.9328 | 0.2277 | | | 10.4372 |
| S3 | Aspheric | −19.1754 | 0.2000 | 1.49 | 70.3 | 80.0000 |
| S4 | Aspheric | −31.7799 | 0.1000 | | | −99.0000 |
| S5 | Aspheric | 3.3530 | 0.2603 | 1.76 | 27.6 | −0.1902 |
| S6 | Aspheric | 3.0318 | 0.3488 | | | −0.0501 |
| S7 | Aspheric | −10.0113 | 0.7152 | 1.62 | 60.3 | −31.4834 |
| S8 | Aspheric | −1.8157 | 0.1092 | | | 0.0290 |
| S9 | Aspheric | −4.5905 | 0.5713 | 1.69 | 50.5 | −11.3876 |
| S10 | Aspheric | −3.7468 | 0.1000 | | | −31.3180 |
| S11 | Aspheric | 3.5601 | 0.2452 | 1.70 | 30.3 | 0.9408 |
| S12 | Aspheric | 2.1585 | 0.7701 | | | 0.0077 |
| S13 | Aspheric | −26.2880 | 0.3621 | 1.55 | 56.1 | 70.6043 |
| S14 | Aspheric | 86.7577 | 0.3365 | | | 80.0000 |
| S15 | Aspheric | −6.7405 | 0.4264 | 1.65 | 44.7 | 2.9972 |
| S16 | Aspheric | 4.6124 | 0.1004 | | | −6.1808 |
| S17 | Spherical | Infinite | 0.2000 | 1.52 | 64.2 | |
| S18 | Spherical | Infinite | 0.0811 | | | |
| S19 | Spherical | Infinite | | | | |

TABLE 29

| Surface number | A4 | A6 | A8 | A10 | A12 |
|---|---|---|---|---|---|
| S1 | −5.5100E−03 | 1.7713E−02 | −1.2110E−01 | 3.8873E−01 | −7.0248E−01 |
| S2 | −1.9880E−02 | −2.2600E−02 | 9.1730E−02 | −2.6511E−01 | 4.6069E−01 |
| S3 | −4.5400E−03 | −9.0020E−02 | 8.5036E−02 | 1.1601E−01 | −5.2343E−01 |
| S4 | −7.7920E−02 | −1.5500E−01 | 3.8720E−01 | −4.4976E−01 | 2.6051E−01 |
| S5 | −1.4636E−01 | −1.9628E−01 | 4.0772E−01 | −6.8546E−01 | 1.0235E+00 |
| S6 | −6.1740E−02 | −1.6483E−01 | 2.6337E−01 | −2.7087E−01 | 2.2747E−01 |
| S7 | 1.4159E−02 | −1.5780E−02 | 3.5973E−02 | −8.5990E−02 | 1.3420E−01 |
| S8 | 2.8790E−03 | 3.9895E−02 | −6.2210E−02 | 5.8793E−02 | −2.7650E−02 |
| S9 | −3.6070E−02 | 4.5403E−02 | −5.1690E−02 | 3.0393E−02 | 6.7790E−03 |
| S10 | −1.2501E−01 | 1.1217E−01 | −7.8340E−02 | 1.2053E−02 | 3.3162E−02 |
| S11 | −1.4382E−01 | 3.0134E−02 | −1.7480E−02 | 1.2321E−02 | −4.3200E−03 |
| S12 | −1.0751E−01 | −1.1360E−02 | 2.3124E−02 | −5.7600E−03 | −4.1100E−03 |
| S13 | 1.4623E−02 | 5.2120E−03 | −3.3370E−02 | 3.0338E−02 | −1.8000E−02 |
| S14 | −1.9500E−03 | 7.9880E−03 | −6.4300E−03 | 2.9900E−03 | −7.9000E−04 |
| S15 | −8.3970E−02 | 3.4547E−02 | 8.1830E−03 | −7.5400E−03 | 1.9650E−03 |
| S16 | −5.0500E−02 | 1.8666E−02 | −4.9000E−03 | 1.1180E−03 | −2.2000E−04 |

| Surface number | A14 | A16 | A18 | A20 |
|---|---|---|---|---|
| S1 | 7.5835E−01 | −4.8662E−01 | 1.7199E−01 | −2.6010E−02 |
| S2 | −4.5526E−01 | 2.4173E−01 | −5.5120E−02 | 1.1270E−03 |
| S3 | 8.5097E−01 | −7.3861E−01 | 3.3814E−01 | −6.4230E−02 |
| S4 | −2.6320E−02 | −5.4890E−02 | 2.8148E−02 | −4.0500E−03 |
| S5 | −1.1699E+00 | 8.5216E−01 | −3.4005E−01 | 5.6217E−02 |
| S6 | −1.7250E−01 | 9.9018E−02 | −3.2730E−02 | 4.4730E−03 |
| S7 | −1.2892E−01 | 6.9457E−02 | −1.9090E−02 | 2.0820E−03 |
| S8 | 7.1420E−03 | −2.6600E−03 | 1.2790E−03 | −2.4000E−04 |
| S9 | −1.9950E−02 | 1.1523E−02 | −2.9800E−03 | 2.9800E−04 |
| S10 | −3.2000E−02 | 1.3581E−02 | −2.8900E−03 | 2.4900E−04 |
| S11 | −1.4000E−04 | 2.0100E−04 | 5.5200E−05 | −1.7000E−05 |
| S12 | 3.3000E−03 | −1.0200E−03 | 1.5500E−04 | −9.7000E−06 |
| S13 | 7.0170E−03 | −1.6500E−03 | 2.0600E−04 | −1.1000E−05 |
| S14 | 1.0800E−04 | −6.2000E−06 | −8.2000E−10 | 9.4200E−09 |
| S15 | −2.7000E−04 | 2.0800E−05 | −8.7000E−07 | 1.5600E−08 |
| S16 | 3.0500E−05 | −2.7000E−06 | 1.2800E−07 | −2.6000E−09 |

TABLE 30

| | | | |
|---|---|---|---|
| f1 (mm) | 6.98 | f7 (mm) | −36.91 |
| f2 (mm) | −100.00 | f8 (mm) | −4.13 |
| f3 (mm) | −64.07 | f (mm) | 3.97 |
| f4 (mm) | 3.45 | TTL (mm) | 5.65 |
| f5 (mm) | 23.27 | ImgH (mm) | 3.56 |
| f6 (mm) | −8.40 | | |

FIG. 20A illustrates a longitudinal aberration curve of the optical imaging lens group according to example 10, representing deviations of focal points converged by light of different wavelengths after passing through the lens group. FIG. 20B illustrates an astigmatic curve of the optical imaging lens group according to example 10, representing a curvature of a tangential plane and a curvature of a sagittal plane. FIG. 20C illustrates a distortion curve of the optical imaging lens group according to example 10, representing amounts of distortion corresponding to different image heights. FIG. 20D illustrates a lateral color curve of the optical imaging lens group according to example 10, representing deviations of different image heights on an imaging plane after light passes through the lens group. It can be seen from FIG. 20A to FIG. 20D that the optical imaging lens group provided in example 10 may achieve good image quality.

In view of the above, examples 1 to 10 respectively satisfy the relationship shown in Table 31.

TABLE 31

| | Example | | | | | | | | | |
|---|---|---|---|---|---|---|---|---|---|---|
| Conditional | 1 | 2 | 3 | 4 | 5 | 6 | 7 | 8 | 9 | 10 |
| f1/f4 | 2.42 | 2.10 | 2.18 | 1.83 | 2.09 | 2.08 | 2.07 | 2.05 | 2.09 | 2.02 |
| f8/f | −0.77 | −0.78 | −0.71 | −0.80 | −0.74 | −0.71 | −0.83 | −1.04 | −1.02 | −1.04 |
| R5/R6 | 1.72 | 1.76 | 1.64 | 1.69 | 1.33 | 1.02 | 1.00 | 1.01 | 1.18 | 1.11 |
| TTL/ImgH | 1.55 | 1.53 | 1.48 | 1.48 | 1.46 | 1.45 | 1.50 | 1.55 | 1.57 | 1.59 |
| \|f/f2\| + \|f/f3\| | 0.95 | 0.88 | 0.80 | 0.77 | 0.25 | 0.09 | 0.12 | 0.13 | 0.21 | 0.10 |
| \|f/(f5 + f6)\| | 0.04 | 0.02 | 0.01 | 0.01 | 0.01 | 0.01 | 0.02 | 0.22 | 0.25 | 0.27 |
| R8/R7 | 0.27 | 0.26 | 0.23 | 0.23 | 0.10 | 0.17 | 0.18 | 0.18 | 0.22 | 0.18 |
| R12/R11 | 0.87 | 0.81 | 0.97 | 0.97 | 0.97 | 0.97 | 0.75 | 0.62 | 0.62 | 0.61 |
| f/EPD | 1.65 | 1.70 | 1.58 | 1.56 | 1.53 | 1.67 | 1.73 | 1.75 | 1.78 | 1.82 |
| T67/CT7 | 2.90 | 2.97 | 2.80 | 2.49 | 2.07 | 2.90 | 2.71 | 1.97 | 1.95 | 2.13 |
| CT4/TTL*10 | 1.23 | 1.20 | 1.30 | 1.24 | 1.46 | 1.49 | 1.43 | 1.35 | 1.28 | 1.27 |
| R1/R2 | 0.55 | 0.44 | 0.49 | 0.46 | 0.43 | 0.46 | 0.47 | 0.47 | 0.50 | 0.42 |
| f/R16 | 1.05 | 1.03 | 1.18 | 0.98 | 1.07 | 1.17 | 1.03 | 0.92 | 0.87 | 0.86 |
| ImgH/f | 0.92 | 0.92 | 0.96 | 0.97 | 0.98 | 0.97 | 0.94 | 0.91 | 0.89 | 0.90 |

The present disclosure further provides an imaging apparatus, having an electronic photosensitive element which may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device, such as a mobile phone. The imaging apparatus is equipped with the optical imaging lens group described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens group, sequentially from an object side to an image side along an optical axis, comprising: a first lens, a second lens, a third lens, a fourth lens, a fifth lens, a sixth lens, a seventh lens and an eighth lens, each of which has refractive power,
   wherein,
   each of the first lens and the fourth lens has positive refractive power;
   the eighth lens has negative refractive power;
   an object-side surface of the third lens is a convex surface, and an image-side surface of the third lens is a concave surface;
   an object-side surface of the fourth lens is a concave surface, and an image-side surface of the fourth lens is a convex surface; and
   |f/f2|+|f/f3|<1, where f is a total effective focal length of the optical imaging lens group, f2 is an effective focal length of the second lens, and f3 is an effective focal length of the third lens,
   wherein 1.8<T67/CT7<3, where T67 is a spaced interval between the sixth lens and the seventh lens along the optical axis, and CT7 is a center thickness of the seventh lens along the optical axis.

2. The optical imaging lens group according to claim 1, wherein 1<f1/f4<2.5, where f1 is an effective focal length of the first lens, and f4 is an effective focal length of the fourth lens.

3. The optical imaging lens group according to claim 1, wherein 0.2<R1/R2<0.7, where R1 is a radius of curvature of an object-side surface of the first lens, and R2 is a radius of curvature of an image-side surface of the first lens.

4. The optical imaging lens group according to claim 1, wherein 0.5<f/R16<1.5, where f is the total effective focal length of the optical imaging lens group, and R16 is a radius of curvature of an image-side surface of the eighth lens.

5. The optical imaging lens group according to claim 1, wherein 1<CT4/TTL*10<1.5, where CT4 is a center thickness of the fourth lens along the optical axis, and TTL is a distance along the optical axis from an object-side surface of the first lens to an imaging plane of the optical imaging lens group.

6. An optical imaging lens group, sequentially from an object side to an image side along an optical axis, comprising: a first lens, a second lens, a third lens, a fourth lens, a fifth lens, a sixth lens, a seventh lens and an eighth lens, each of which has refractive power, wherein, each of the first lens and the fourth lens has positive refractive power;

the eighth lens has negative refractive power;

an object-side surface of the third lens is a convex surface, and an image-side surface of the third lens is a concave surface;

an object-side surface of the fourth lens is a concave surface, and an image-side surface of the fourth lens is a convex surface; and 1<f1/f4<2.5, where f1 is an effective focal length of the first lens, and f4 is an effective focal length of the fourth lens, wherein 1.8<T67/CT7<3, where T67 is a spaced interval between the sixth lens and the seventh lens along the optical axis, and CT7 is a center thickness of the seventh lens along the optical axis.

7. The optical imaging lens group according to claim 6, wherein 0.2<R1/R2<0.7, where R1 is a radius of curvature of an object-side surface of the first lens, and R2 is a radius of curvature of an image-side surface of the first lens.

8. The optical imaging lens group according to claim 6, wherein 0<R8/R7<0.5, where R7 is a radius of curvature of the object-side surface of the fourth lens, and R8 is a radius of curvature of the image-side surface of the fourth lens.

9. The optical imaging lens group according to claim 6, wherein 1≤R5/R6≤1.8, where R5 is a radius of curvature of the object-side surface of the third lens, and R6 is a radius of curvature of the image-side surface of the third lens.

10. The optical imaging lens group according to claim 9, wherein |f/f2|+|f/f3|<1, where f is a total effective focal length of the optical imaging lens group, f2 is an effective focal length of the second lens, and f3 is an effective focal length of the third lens.

11. The optical imaging lens group according to claim 6, wherein 0.5<f/R16<1.5, where f is a total effective focal length of the optical imaging lens group, and R16 is a radius of curvature of an image-side surface of the eighth lens.

12. The optical imaging lens group according to claim 11, wherein −1.5<f8/f<−0.5, where f8 is an effective focal length of the eighth lens, and f is the total effective focal length of the optical imaging lens group.

13. The optical imaging lens group according to claim 6, wherein 0.5<R12/R11<1, where R12 is a radius of curvature of an image-side surface of the sixth lens, and R11 is a radius of curvature of an object-side surface of the sixth lens.

14. The optical imaging lens group according to claim 13, wherein |f/(f5+f6)|<0.4, where f is a total effective focal length of the optical imaging lens group, f5 is an effective focal length of the fifth lens, and f6 is an effective focal length of the sixth lens.

15. The optical imaging lens group according to claim 6, wherein ImgH/f<1, where ImgH is half of the diagonal length of the effective pixel area on the imaging plane of the optical imaging lens group, and f is a total effective focal length of the optical imaging lens group.

16. The optical imaging lens group according to claim 15, wherein TTL/ImgH≤1.6, where TTL is a distance along the optical axis from an object-side surface of the first lens to the imaging plane of the optical imaging lens group, and ImgH is half of the diagonal length of the effective pixel area on the imaging plane of the optical imaging lens group.

17. The optical imaging lens group according to claim 16, wherein 1<CT4/TTL*10<1.5, where CT4 is a center thickness of the fourth lens along the optical axis, and TTL is the distance along the optical axis from the object-side surface of the first lens to the imaging plane of the optical imaging lens group.

18. The optical imaging lens group according to claim 15, wherein f/EPD<1.9, where f is the total effective focal length of the optical imaging lens group, and EPD is an entrance pupil diameter of the optical imaging lens group.

\* \* \* \* \*